United States Patent [19]
Diamond

[11] Patent Number: 5,540,013
[45] Date of Patent: Jul. 30, 1996

[54] STELLATE HINGED POLYGONS FORMING A FAMILY OF COMPLEX POLYHEDRONS HAVING DISCRETE INTERIORS AND EXTERIORS

[76] Inventor: Gary C. Diamond, 316 N. Maple St. #242, Burbank, Calif. 91505

[21] Appl. No.: 119,630

[22] Filed: Sep. 13, 1993

[51] Int. Cl.[6] .................... E04B 7/16; E04B 7/08
[52] U.S. Cl. .................... 52/70; 52/71; 52/80.1; 52/81.1; 52/81.4; 52/81.5; 52/DIG 10; 52/646; 52/745.07
[58] Field of Search .................... 52/80.1, 80.2, 52/81.1, 81.2, 81.5, 81.4, 82, DIG 10, 640, 646, 71, 70, 745.07, 745.08, 747.1

[56] References Cited

U.S. PATENT DOCUMENTS

| | | | |
|---|---|---|---|
| 2,716,993 | 9/1955 | Codrick | 52/81.2 X |
| 4,309,852 | 1/1982 | Stolpin | 52/DIG. 10 X |
| 4,502,257 | 3/1985 | Diamond . | |
| 4,603,519 | 8/1986 | Lew et al. | 52/81.2 |
| 4,682,450 | 7/1987 | Diamond . | |
| 4,864,796 | 9/1989 | Diamond . | |
| 4,876,831 | 10/1989 | Runyon | 52/70 |

FOREIGN PATENT DOCUMENTS 2717275  10/1978  Germany .................... 52/71

*Primary Examiner*—Kien T. Nguyen
*Attorney, Agent, or Firm*—Loeb & Loeb LLP

[57] ABSTRACT

A structure formed from a new family of polyhedral models and rigid structures. The structure having discrete interior and exterior elements, and is formed from a plurality of stellate-hinged polygonal modules. Each stellate hinged-polygonal module has at least three polygonal structures coupled to a hinge or axis by a base edge. The angle between the at least three polygonal structures may be variable.

43 Claims, 33 Drawing Sheets

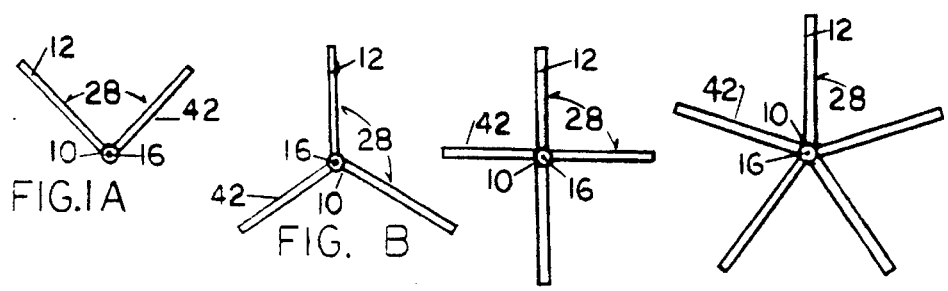
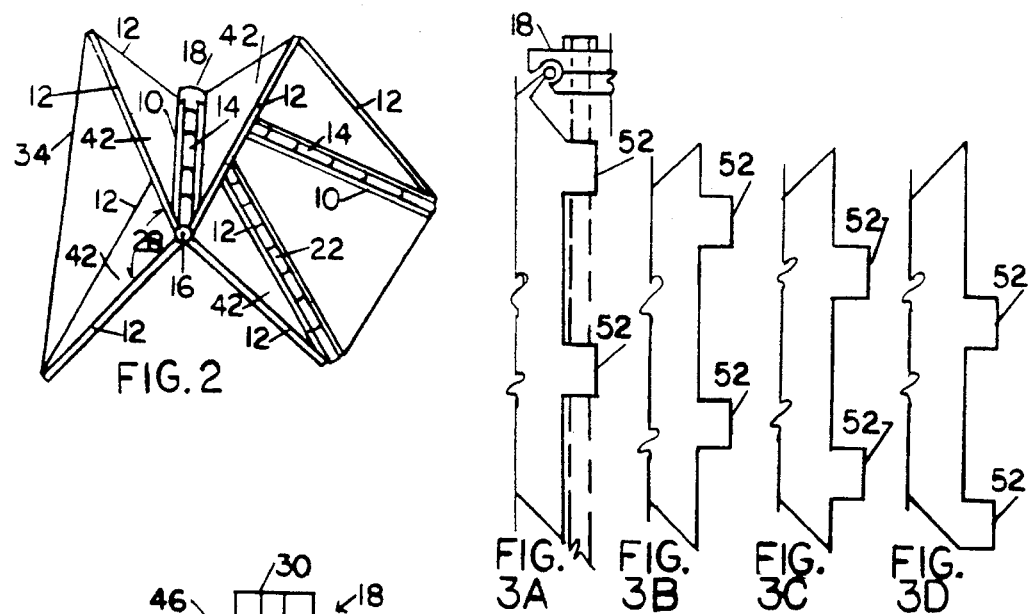
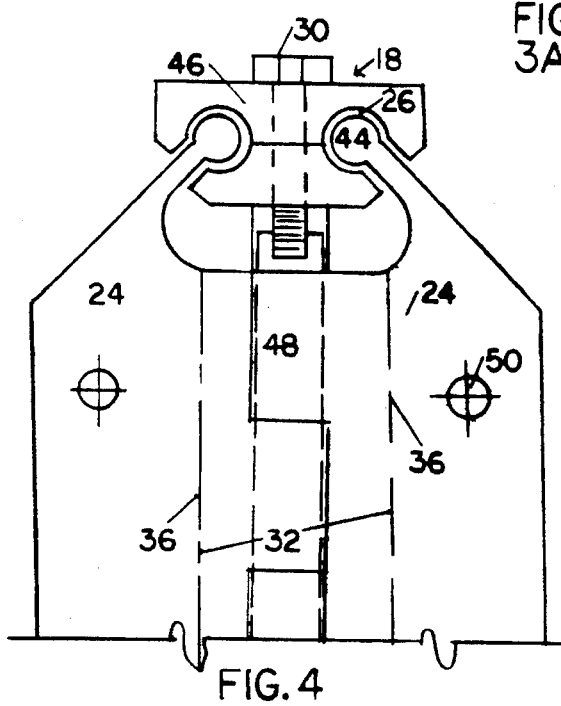
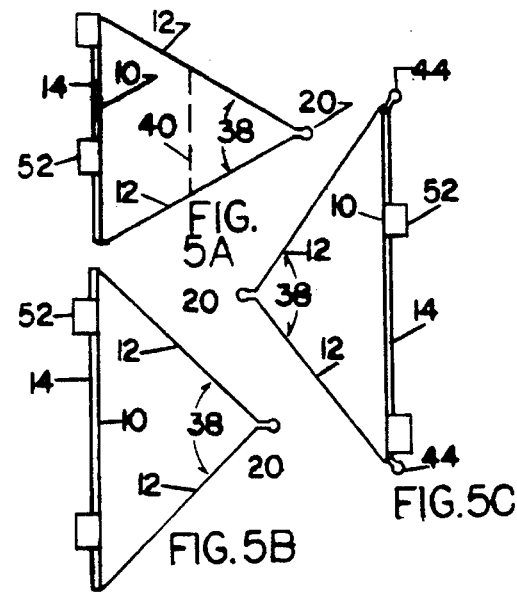

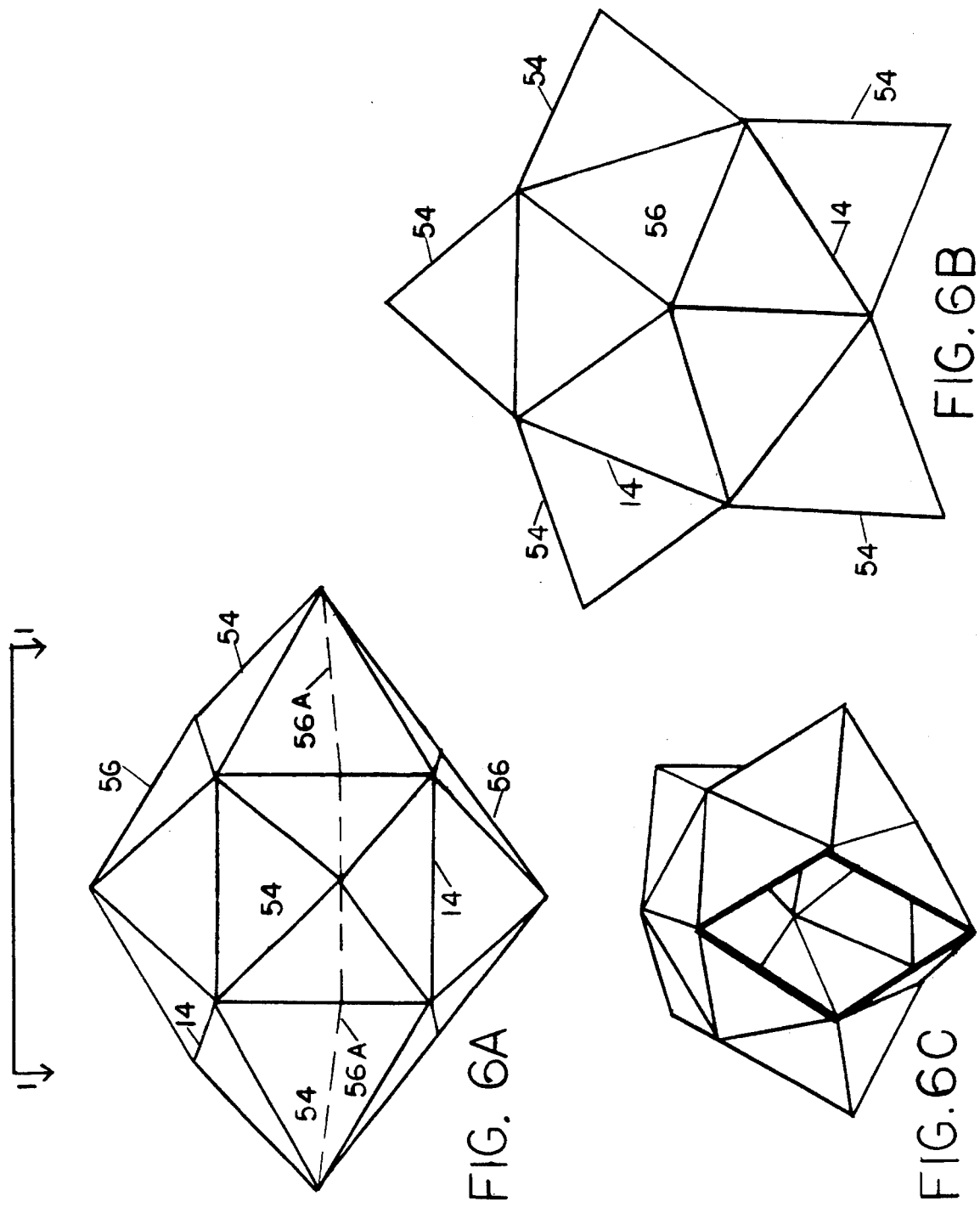

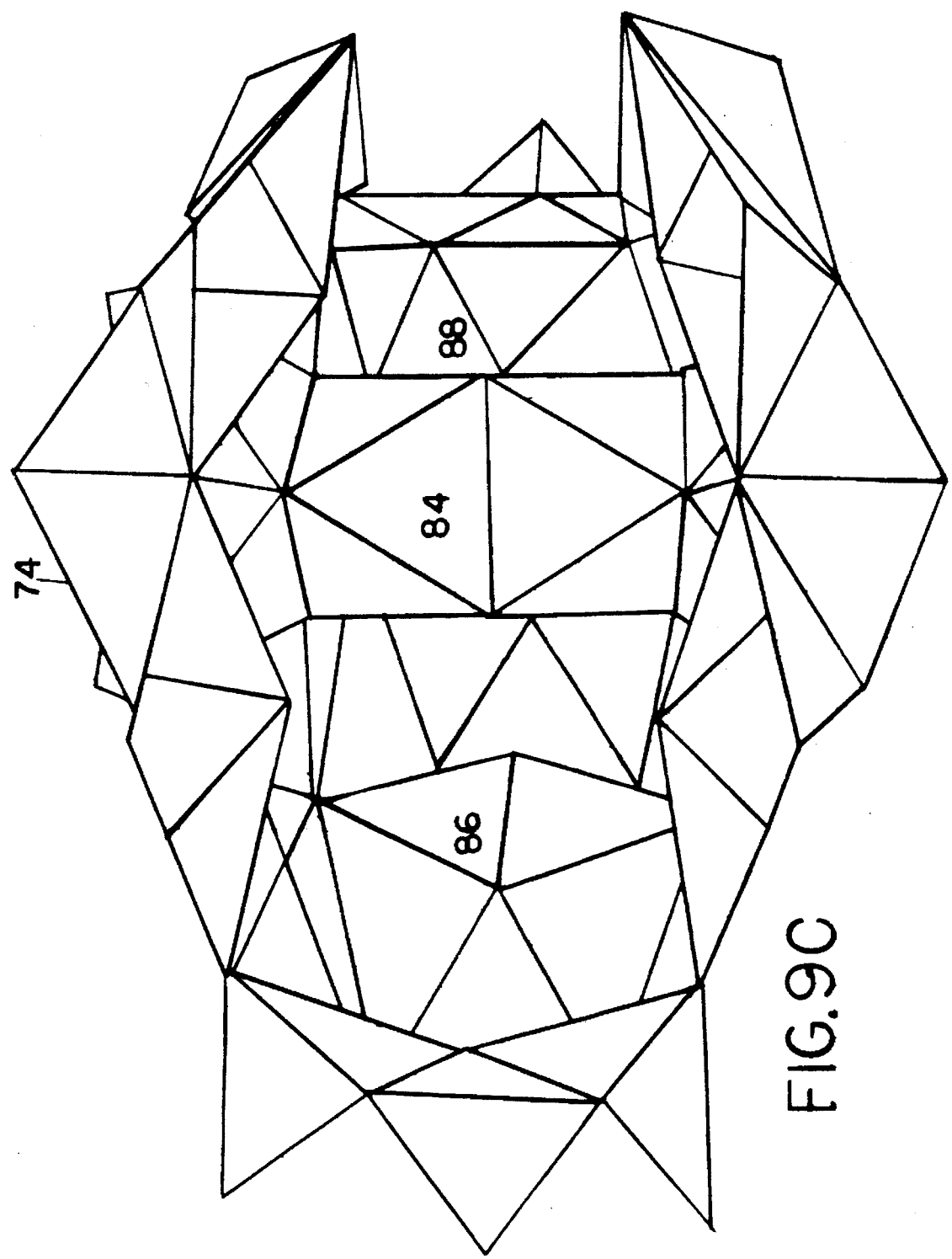

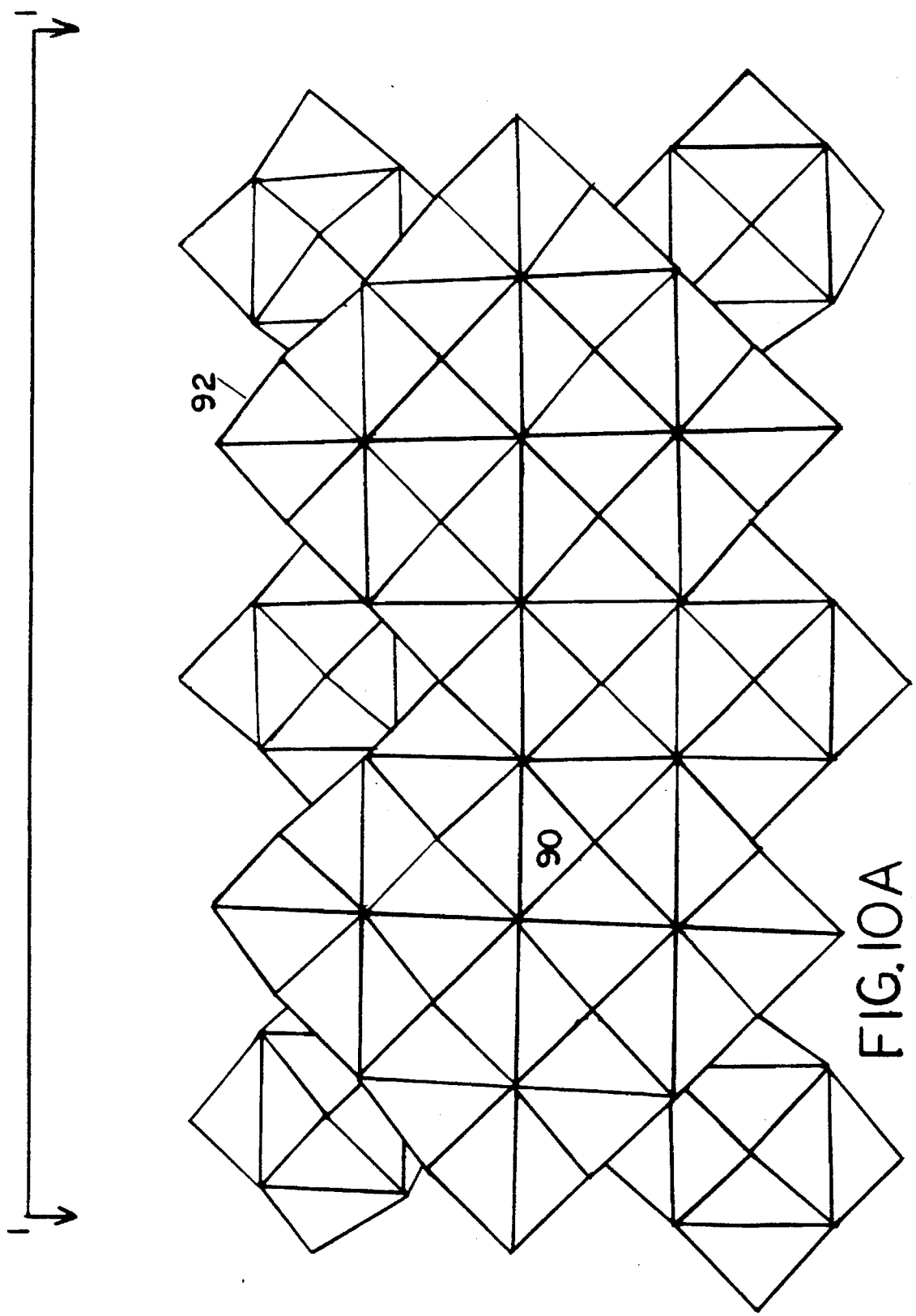
FIG. IOA

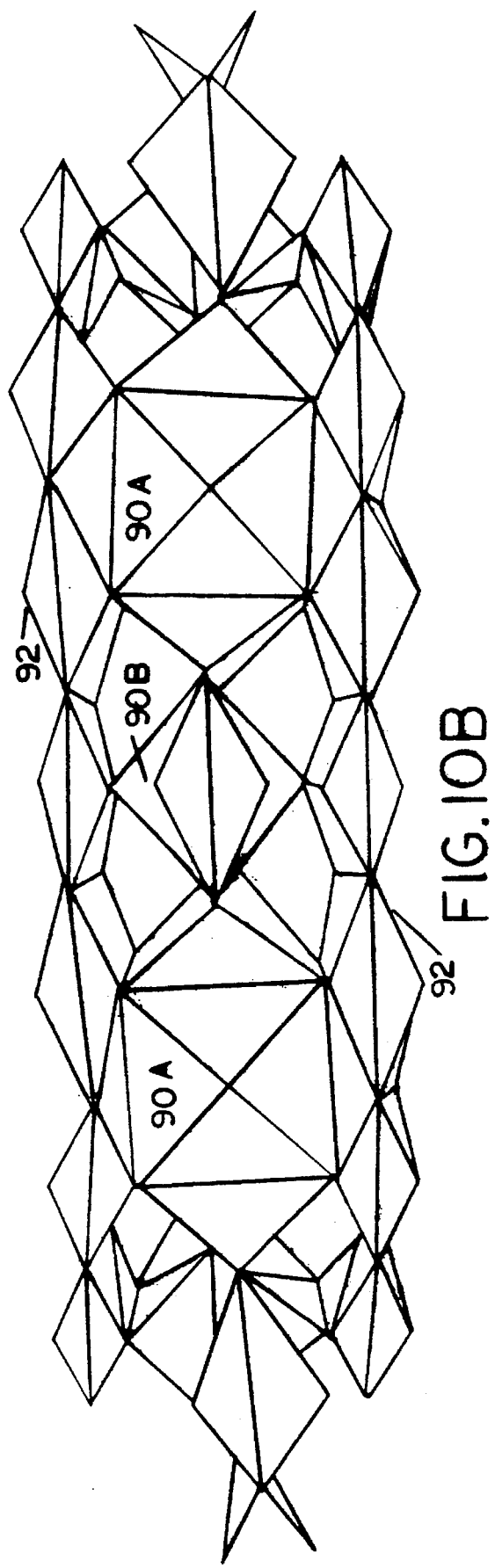

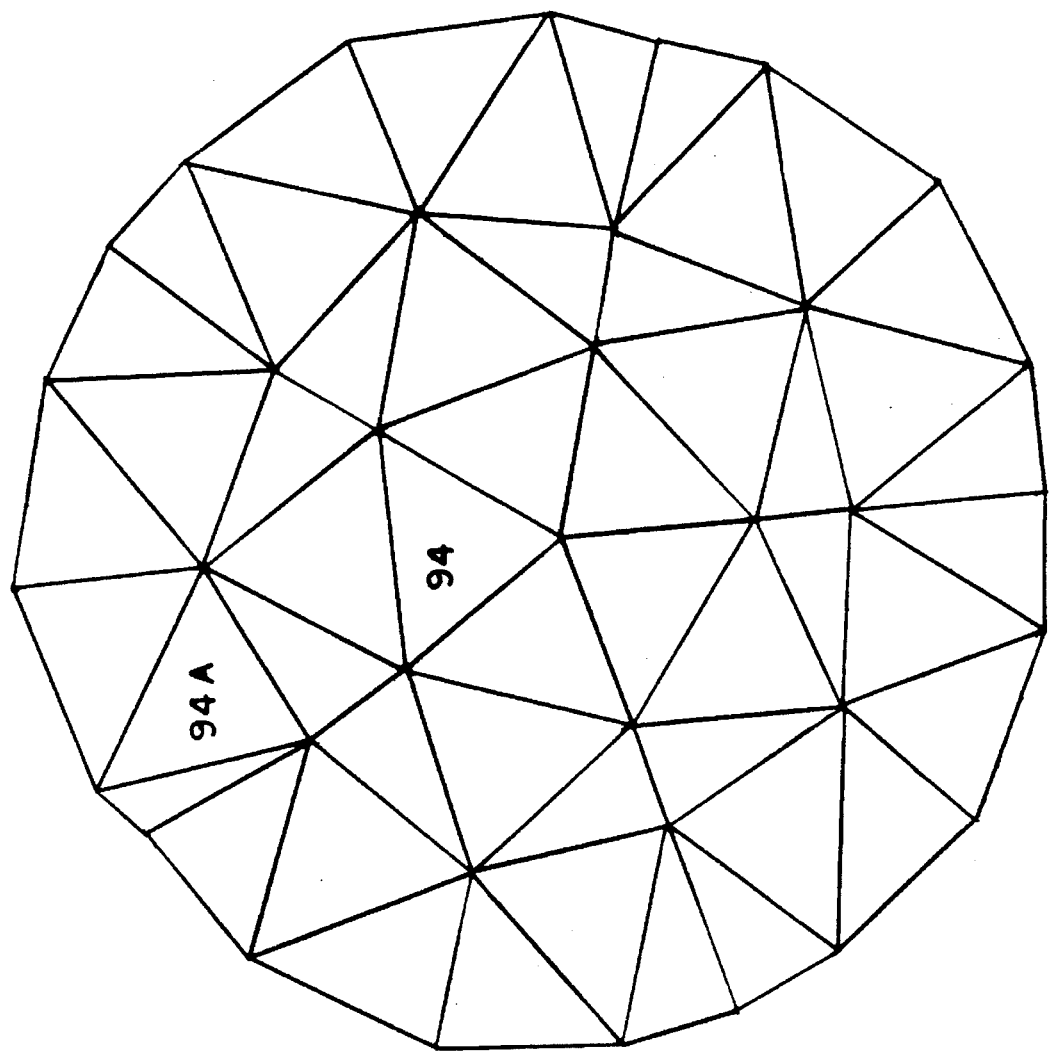

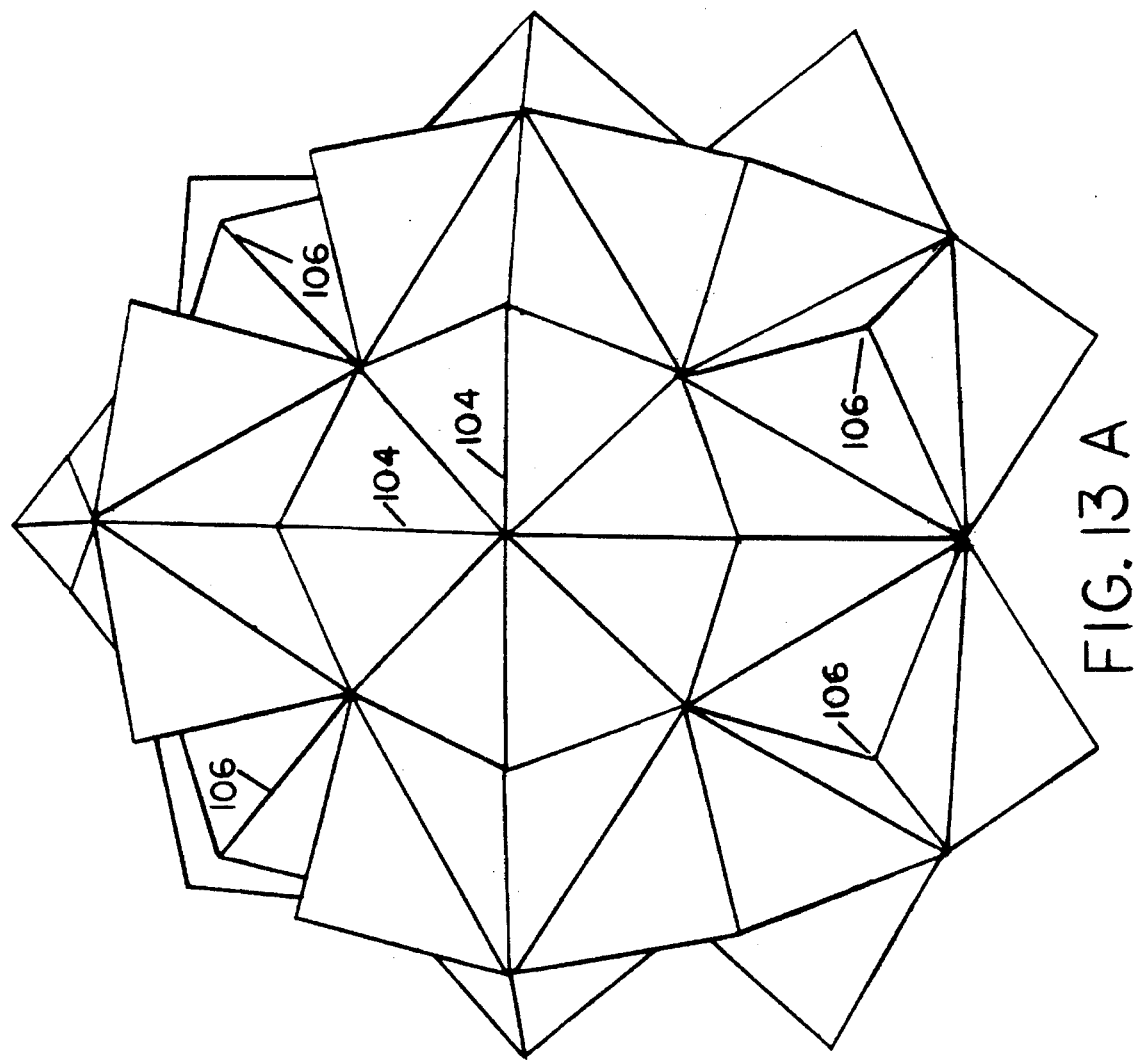

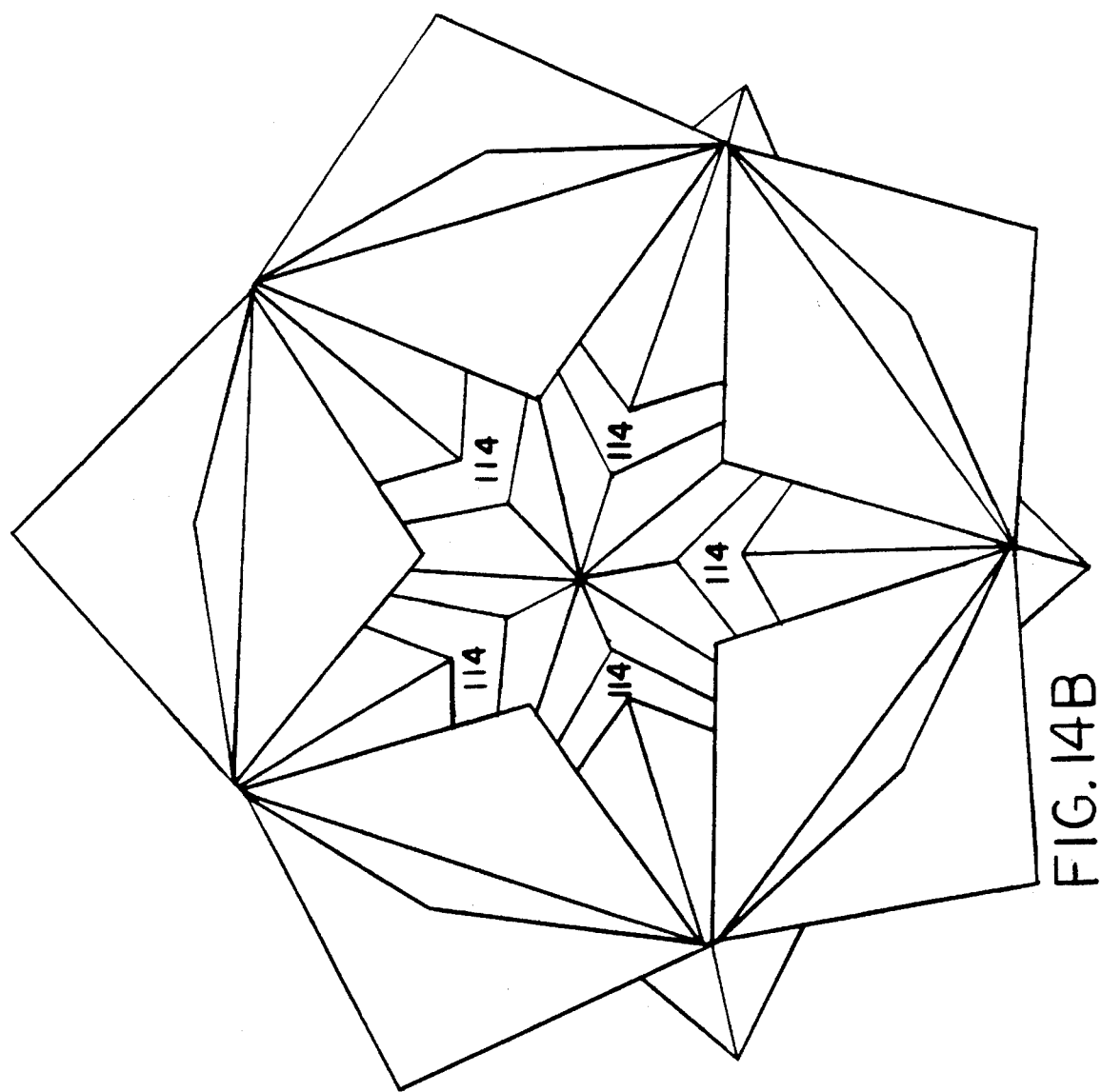

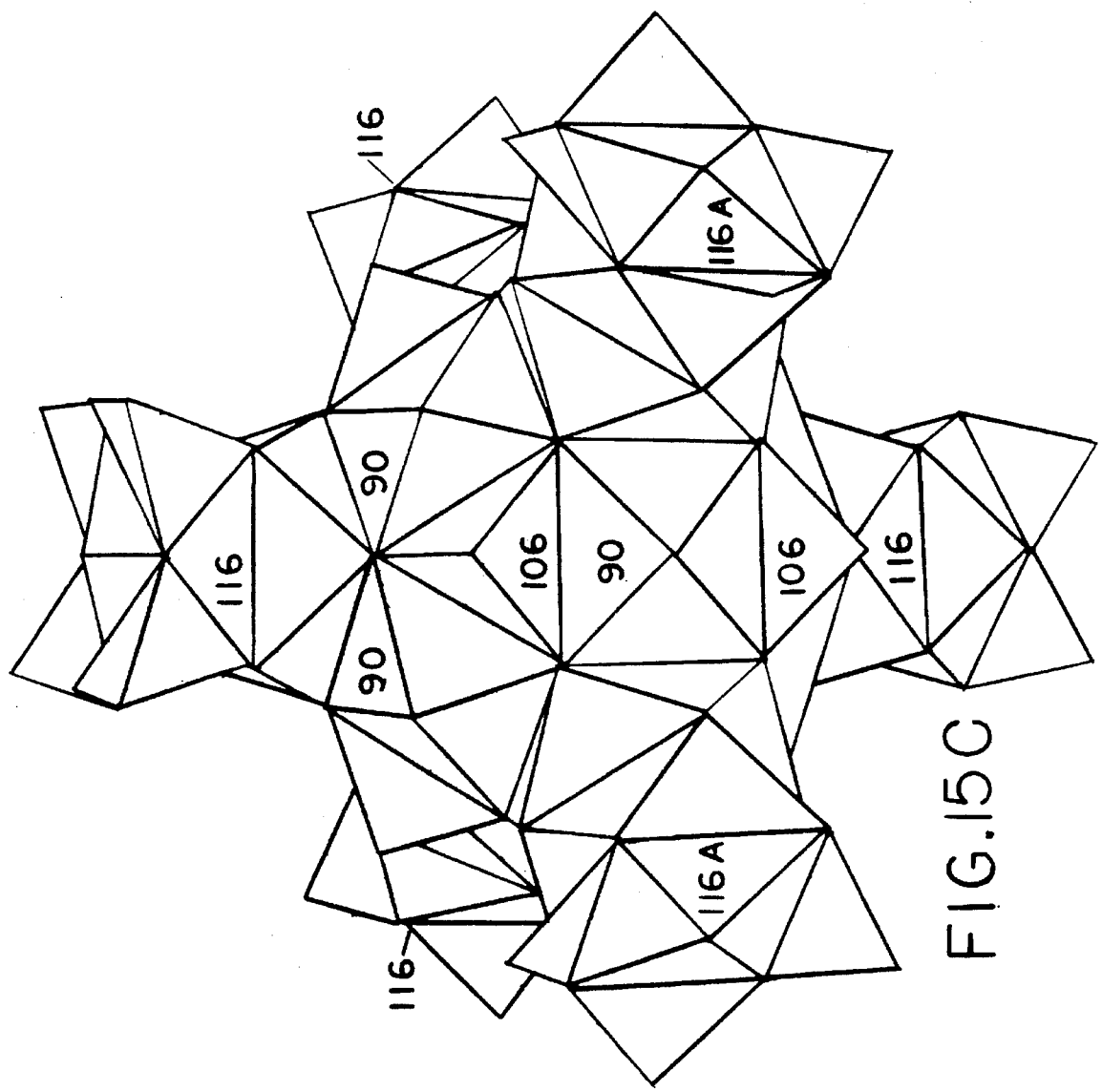

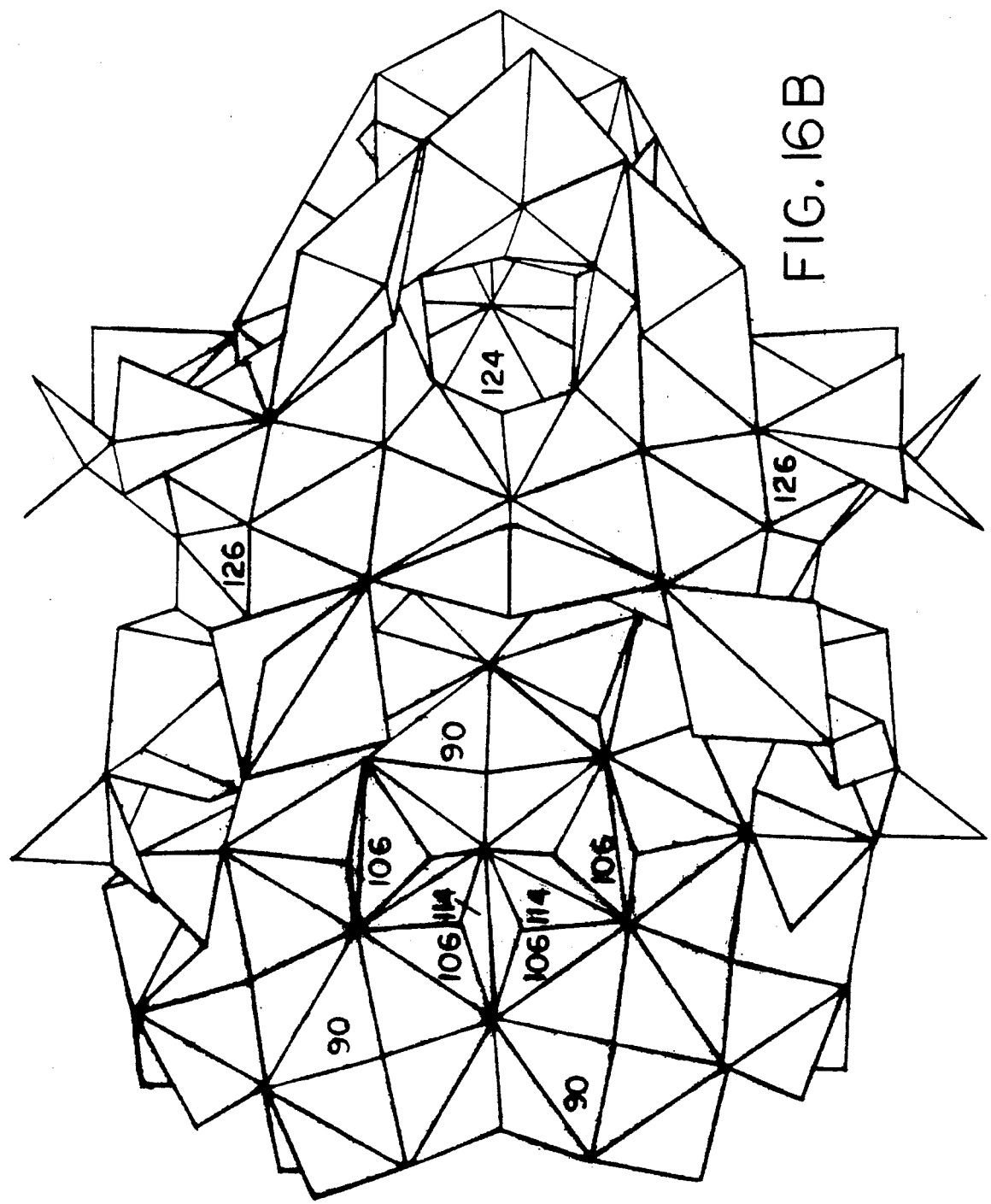

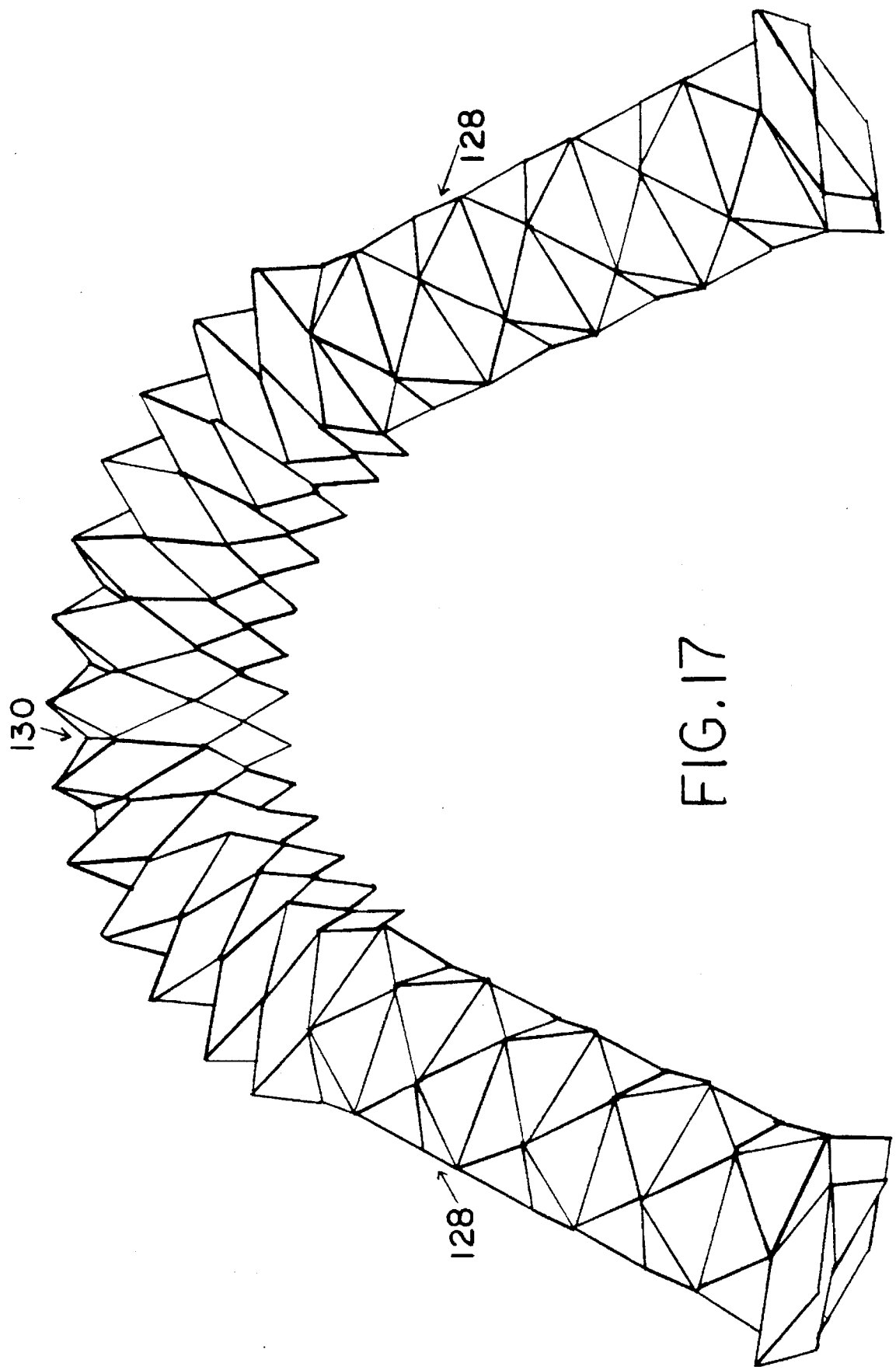

STELLATE HINGED POLYGONS FORMING A FAMILY OF COMPLEX POLYHEDRONS HAVING DISCRETE INTERIORS AND EXTERIORS

BACKGROUND—CROSS-REFERENCE TO RELATED APPLICATIONS

To the best of Applicant's knowledge, no prior art exists which contains any of the new teachings of the instant application, or the particular combination of specific features of the embodiments of the present invention.

However, the present invention has evolved from experiments done using modified models following on the teachings of the applicant's prior U.S. Pat. No. 4,502,257 issued Mar. 5, 1985. In one possible model of the teaching of the prior U.S. Pat. No. 4,502,257 the diagonals of a square were investigated to form a module according to that prior patent. By continuing to develop newer geometric models and in working by modifying structures discovered in the prior U.S. Pat. No. 4,502,257, specifically in working with the module formed of the diagonals of a square sheet, the applicant's subsequent U.S. Pat. No. 4,682,450 issued Jul. 28, 1987 was granted for a structure having an exterior shape being at least a partial triakis icosohedron and having an interior shape being at least a partial great dodecahedron. At the time of prosecuting this prior patent, a simple geometric description of the mathematical form of the model claimed was requested by the applicant to be allowed, but this was rejected by the examiner, and the independent claims as finally allowed were a compromise, leaving the simpler geometric description relating to the different discrete structures formed on the interior and the exterior of the model to be allowed as dependent claims only.

Later experiments following on and further developing beyond the teaching of the U.S. Pat. No. 4,682,450 for a geometric framework, yielded new teachings which were patented in the applicant's U.S. Pat. No. 4,864,796 issued Sep. 12, 1989, for a Variable Polyhedral Framework. This patent also contained the quality of having "sidedness" in that a geometric model was disclosed being a variable space-framework whose several structural forms, though identical, were discrete and located on different sides of the plane, discrete from one side of the model to the other, reversed in both location and orientation. In other words, the model of the applicant's prior U.S. Pat. No. 4,864,796 contained a "thickness" being the depth of the framework across the plane of symmetry, and surfaces on one side of the plane were discrete and separate from surfaces on the other side of the plane.

Further experimentation following the paths opened by the applicant's prior patents has now led to the development of many newer, and different models having none of the features of formation and none of the forms of the applicants earlier patents, and a new, more generic teaching which is the matter of the instant application. Following along the ideas of modularity, planar panels making polyhedral frameworks having a depth, an interior and exterior with discrete surfaces formed across that depth, and frameworks being easily clad, and the other ideas as discussed below have led to the teaching of embodiments of the present invention.

In the applicant's previous U.S. Pat. No. 4,864,796 for a Variable Polyhedron, the ball and socket device located at each end of the linear hinge axis functions in effect as a hinge and is defined in Column 4, lines 35–36 as "a variable means being either a ball and socket means or a hinge means".

Further research with the teaching of these prior patents has discovered that the ball and sockets when joined to edges, in the case of this patent, to the edges of polygons in a specific manner, may in and of themselves function as a hinge This new teaching is also included in embodiments of the present invention.

Though the continuity of ideas and models can be clearly seen to be evolving as the natural outgrowth of continued research and experimentation in following some of the ideas of the earlier patents; the generic teaching of the instant application is a new teaching, being the fruition of continued research Of one branch direction leading away from but encompassing some of the earlier patents.

In the instant application, the hinge feature has become one of the essential teachings, and has been found to be the basis for a simpler generic teaching encompassing some features of the earlier patents and in addition many new features being the basic module and the several unique polyhedral structures embodiments of the present invention never before disclosed, comprising the new teaching of embodiments of the present invention.

In essence, the applicant's earlier abovementioned patents are in fact the pedagogic tools and transitional stages used in the continual development of a sequence of particular species of a larger generic teaching now disclosed and the different teaching of a domain of unique polyhedral geometric structures, of which the genus has subsequently been discovered, and the generic and specific claims of this domain of geometry are the new teaching of the instant application.

In addition, some additional material disclosures were made to the patent office in the forms of photographs of models after the U.S. Pat. No. 4,682,450 issued, and were included in the Patent Examiner's file. These models also indicate my further developments in transitional stages leading to the present teaching.

BACKGROUND—FIELD OF INVENTION

Embodiments of this invention relate to complex polyhedral structures formed of stellate-hinged modular structures made of joined polygons, joined about the axis of a linear hinge device. A variable polyhedral key is taught, used in different arrays at different angles of attitude of its several parts to each other, several keys when joined together forming complex rigid polyhedrons.

In particular, emodiments of this invention relate to complex polyhedral frameworks, specifically to such rigid frameworks having discrete, different forms and surfaces being formed and defined at the exterior and at the interior of the frameworks or on either side of a substantially polyhedral framework model, which are formed of stellate-hinged polygons. The basic teaching of the present invention is a geometric module which acts as a key, when used with others of like kind to form previously unknown complex polyhedral models having different discrete triangulated rigid structures at the interior and the exterior of the models.

BACKGROUND—DESCRIPTION OF PRIOR ART

Many different modular structures made from linear struts forming rigid frameworks are known in the prior art. Each solves a particular problem, for example, ease of erection, or of manufacturing from a simpler or more cost effective module.

In some applications, for example, a small manufacturer, or a building program requiring maximum diversity from a minimum inventory or in the trusses for space stations in outer space, a very simply assembled system having a limited number of parts is needed to produce a rigid structure. Such prior art structural systems contain the following number of disadvantages:

(a) In the prior art, for a given framework system its linear struts and connectors can only form a limited number of discrete framework structures. To achieve a different framework or a variety of frameworks, different struts and connectors are required.

(b) In some cases complex and costly connector modules, known in the art as nodes have been taught as required to achieve a versatile amount of diversity for a single framework system. In the prior art, any attempt to achieve a very complex and diverse number of different structural arrays of frameworks from the same modular structural system has not been possible without supplying a number of costly additional connectors, or complex connectors having many different apertures or recesses in the same node to receive the placement of a linear strut in order to orient variously a given geometrical framework.

(c) In attempting solutions to these problems of diversity and variety, the prior art has relied on either clever ways to unfold or erect frameworks, or provided complex specialized shapes of connectors and struts, in essence, attempting streamlining and simplifying ways to achieve known structures through the formation of complex and costly new modules. Obviously, this is a disparity of contradiction; if uniform low-cost ends are desired but high tech means are employed.

(d) The frameworks achieved by the prior art were always previously known geometric polyhedral frameworks, similar to known space frames and other known frames of the prior art. They were more costly and complex in order to achieve some diversity, but finally achieved only preexisting known geometric forms, and failed to teach any new polyhedral forms from those known in the prior geometric art.

(e) In addition, the framework systems which achieved some diversity in the prior art, which were not traditional known space frame systems were thin section shell-like structures or thin frames without depth of stiffening, such as geodesic domes or similar lightweight structures, and therefore not able to resist substantially large imposed loads. Also these thin-shelled structures being only exterior structures, contained no integral means to achieve the formation of differentiation of interior space for usefulness.

(f) The prior art then contained no frameworks systems which were extremely diverse from a minimal means and also able to resist large imposed loads from both the exterior and the interior of the framework. In general, geodesic domes have traditional rectilinear structures used at their interiors, which are not joined to the exterior frame. Traditional spaceframes, and thin shells because of their high cost, and due to the complexity of the form of their nodes and struts and labor intensiveness required are used in only limited ways in building construction, for example as a featured design element only.

(g) Therefore these prior art innovations, were never able to teach a very simple module made from simple and known parts, and a few number of parts, which nonetheless formed new, innovative frameworks of a great diverse variety of types of frameworks all made from the same simple module.

Nor have prior art frameworks formed from simple structural modules ever able to teach new polyheral frameworks of new geometries never before known, and which might have a diversity of applications in varying, different required situations, and might resist large loads.

Nor have prior art frameworks formed from simple structural modules making a great diversity of different geometric models, been able to achieve both rigid interior and exterior structures which were integral to each other but each of discrete separate form.

(h) Other more traditional modular building systems of the prior art often utilize rectilinear building forms as the end product of the construction process, even if some triangulation is also used in the subassemblies used to achieve the final forms. These rectilinear forms are inherently not very rigid and therefore require additional stiffening which must be added to the rectilinear forms to achieve adequate rigidity.

OBJECTS AND ADVANTAGES

Accordingly, besides the objects and advantages of the modules described in my above patent, several objects and advantages embodiments of the present invention are;

(a) to provide a diverse number of very different frameworks, and to achieve this diversity using only a single discrete system of struts and connectors;

(b) to provide a simple and inexpensive connection means, able to achieve a great diversity of frameworks from a single structural system, allowing various orientations of its structural members into a variety of different forms:

(c) to provide a structural framework system made from known shapes of connectors and struts and existing methods of erection and construction which is nonetheless able to achieve a great diversity, complexity, and variety of previously unknown structures;

(d) to provide a simple and inexpensive structural framework system which forms new, previously unknown useful geometric polyhedral frameworks;

(e) to provide a framework system with deep interior triangulated stiffening, able to achieve a great diversity of forms from a minimal means, not being a thin shell or shallow framed single planar lightweight structure, but being discretely deeply stiffened at both its exterior and its interior and therefore able to resist large imposed loads;

(f) to provide a framework system able to achieve great diversity of forms from a minimal means, and still able to resist large imposed loads from both the exterior and the interior of the structures, being very practical frameworks;

(g) to provide a very simple structural modular element made from a few number of known parts, forming a diverse variety of new innovative complex polyhedral frameworks, able to resist large loads;

(h) to provide a modular building system in which all of the component parts of the geometric forming and rigidifying structure of the system are inherently triangulated, requiring little additional bracing to rigidify any larger structures or rectilinear structures made by the present invention, when compared to the prior art;

FURTHER OBJECTS AND ADVANTAGES ARE to provide a stellate wall-sized hinge device utilizing the joinder of multiple polygonal walls to form complex polyhedral structures having discrete interior and exterior structures.

to provide a non-rigid, variable structural modular element being substantially an incomplete polyhedron which when joined with others of like kind then becomes rigidly oriented and forms a greater rigid framework, to provide a modular element which is easy to manufacture, frameworks which are easy to erect, and which are capable of being disassembled and variously reconfigured, which provide a variety of different enclosed shapes of volumes from the same modular elements, to provide both uniform simple extendable arrays of geometric structures and very unique complex geometric frameworks, with different interior and exterior structural forms.

to provide several different faceted substantially cylindrical polyhedral frameworks with discrete interior radial bulkheads, to provide several different variations of substantially spherical polyhedral frameworks with discrete interior triangulation some formed of shallow spaceframe-like frameworks being shallow octohedrons and deltahedra; some with great-circle-like ridges formed from the edges of the hinged polygons of the basic modules of the device of the present application extending about the exterior of the structure and having a substantially great depth of triangulated structure at the interior, to provide substantially rectilinear arrays formed of shallow space-frame being shallow octohedral subassemblies joined both at their base hinge edges and at the non base edges of the basic stellate-hinged polygonal module, to provide several different umbrella-like or parasol-like frameworks having at the interior of the frameworks, central, faceted substantially cylindrical columns with discrete interior bulkheads supporting faceted lozenge-like or flattened spherical or other complex exterior roof forms and which may be extended so that several frameworks may be connected and extended to enclose space with complex polyhedron structures, to provide octohedral frameworks with additional six-faced deltahedra extending both to the interior and to the exterior of the structure about the base of the deltahedra at the faces of the octohedra and with smaller octohedra extending both to the interior and exterior of the structure located at the vertices of the octohedra and whose vertices when additionally differentiated through connection by a linear strut form a tetrakis hexahedron, to provide variable spaceframe structures formed of multiple six-sided deltahedra joined at their base edges, to provide a space-filling eggcrate-like spaceframe structure containing many similar void spaces or a portion thereof used as a pitched roof truss formed of shallow octohedrons being a shallow spaceframe-like structure, the octohedrons joined at their base edges and at the surfaces and edges of the polygons of the hinged polygonal modules of the embodiments of the present invention, linear strut members located between the non-base vertices of the octohedrons as required to further stiffen the structure, to provide a space filling eggcrate-like spaceframe structure containing many similar void spaces and flexible through a variable radius of curvature of the whole structure made of shallow octohedrons joined at their base edges and at the surfaces and edges of the polygons of the hinged polygonal modules of the device of the present invention, linear strut members located between the non-base vertices of the octohedrons as required to further stiffen the structure, to provide three joined substantially cylindrical faceted structures with discrete interior bulkheads thereby forming an overall substantially triangular framework of faceted cylindrical cross section having a footing or foundation anchoring means formed integrally at the corners of the substantial triangular framework made at the location of the axis of the hinge portion of the hinged polygons and thereby formed either with a depression or a void at the center of the three joined cylindrical structures, to provide several different extremely complex polyhedral structures being several joined intersecting substantially spherical faceted structures having some triangulation at their interiors and being formed substantially of shallow spaceframe structures which are shallow octohedrons and of deltahedrons, the intersection of the several spherical structures forming a complex manifold structure with tunnel regions formed from the proximity of three faceted substantially cylindrical connecting regions made of the stellate-hinged polygons of embodiments of the present invention, to provide a variable network of deltahedrons formed symmetrically across a planar mat which may be varied by hinging means at tile bases of the deltahedrons which forms several different faceted substantially cylindrical structures and in addition forms a structure being at its exterior a deep triakis-icosohedron and at its interior a great dodecahedron, to provide a research tool for the systematic testing of a multi-leaved stellate-hinged wall, which may be used to discover further additional new complex polyhedrons formed from the joining of several modules made of the hinged polygons of the device of the present invention joined at various differing angles, also making additional hybrid combinations of the several complex polyhedrons embodiments of the present invention, to provide additional linear strut members to further stiffen and rigidify the structures formed by the hinged polygonal module of the device of the present invention, to provide a comprehensive structural system in which the constituent parts of the basic modules of the system are so simple that some of the elements of the many disparate complex framework structures which may be formed may be easily joined to each other through the abuttment of the substantially identical constituent parts and therefore allows for the formation of the joinder of the many different complex structures of the embodiments of the present invention thereby forming complex framework structures, Still further objects and advantages will become apparent from a consideration of the ensuing description and drawings.

DRAWING FIGURES

In the drawings, closely related figures have the same number but different alphabetic suffixes.

FIGS. 1A to 1D show plan views of several typical embodiments of the non-rigid, freely pivoting basic stellate-hinged module.

FIG. 2 shows a perspective view of one typical embodiment of the basic stellate-hinge, with a second module attached.

FIGS. 3A–3D shows an elevational view of a typical scheme of the form of a multi-leaved stellate-hinge showing the features of the different parts of the barrel of the hinge differently divided into segments for each of the, in this case, four joined polygonal panels, to which the hinge is attached.

FIG. 4 shows a cross-sectional view of the variable node located at the ends of the axis of rotation of the hinge.

FIG. 5A–5C show some typical preferred polygonal panels and their hinge device attachments.

FIGS. 6A–6B show a basic complex polyhedral structure formed from embodiments of the present invention. FIG. 6C shows a cut-away view of a part of the interior of the structure of 6A and 6B.

FIGS. 9A–9C shows a complex polyhedral structure having a faceted columnar cylindrical structure at its center and additional frameworks located at the ends of the axis of the column and continuing out away from the center column.

FIGS. 10A–10B showa complex structure formed of a joining of several parallel layers of shallow octohedral frameworks.

FIGS. 11A–11F show various forms of complex polyhedral frameworks having faceted columnar substantially cylindrical structures at their interior central axes and umbrella parasol-like structures formed at the ends of the axes, as well as hybrid versions of these structures.

Figure 12A:
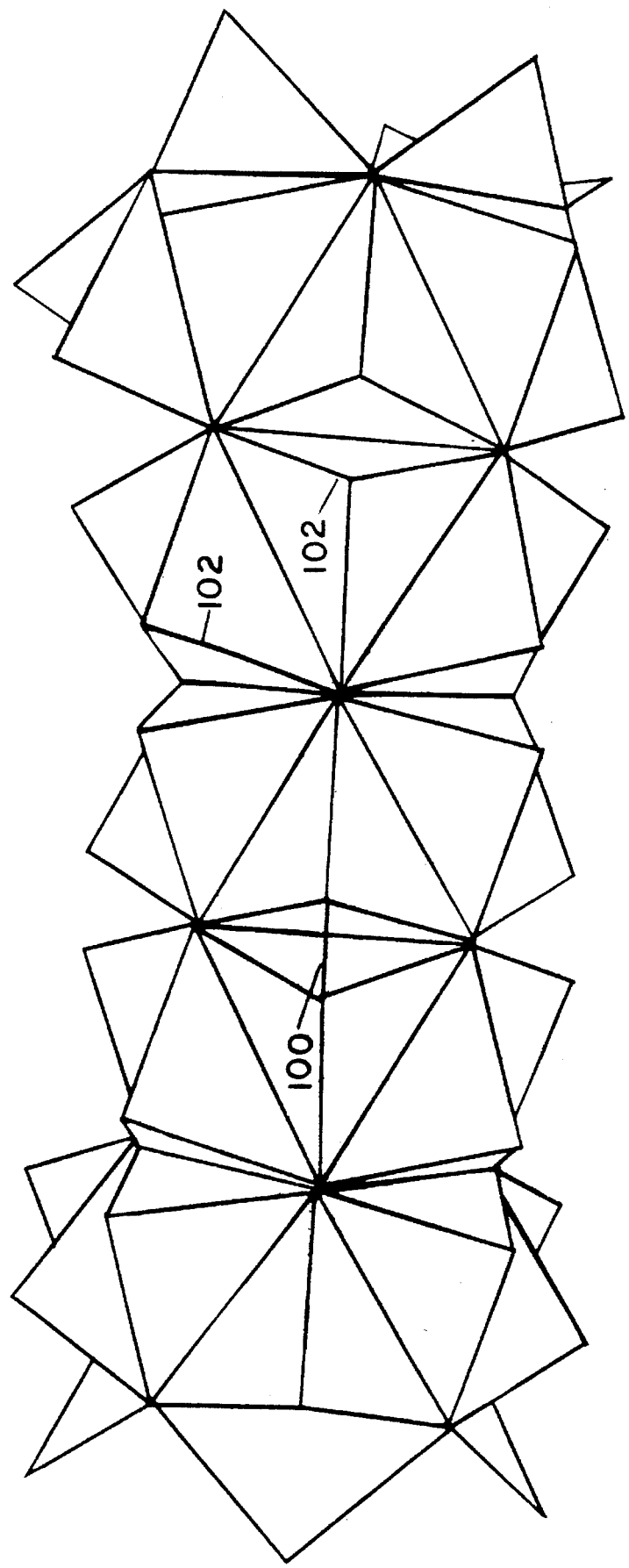
Figure 12B:
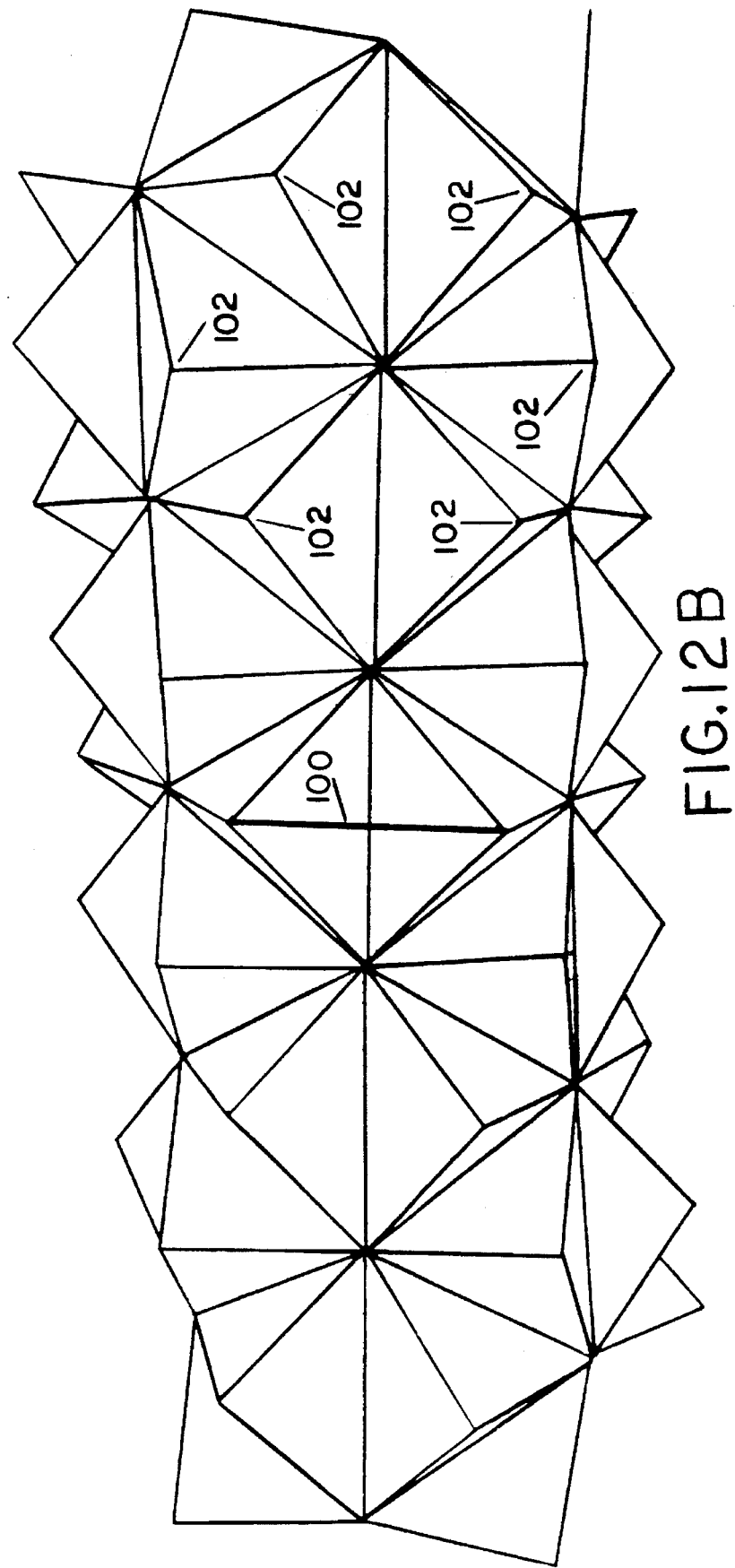
Figure 12C:
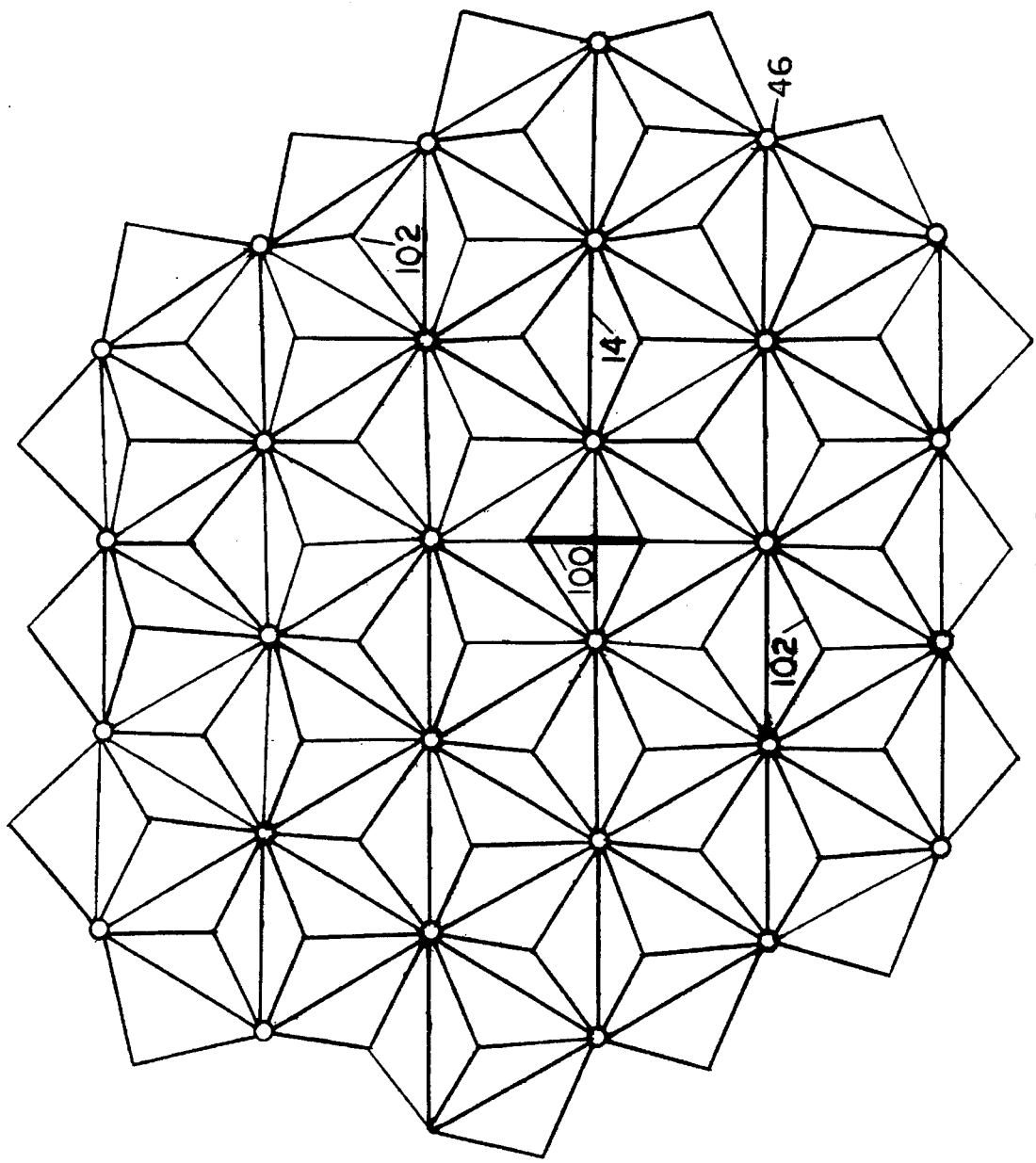

FIGS. 12A–12C show both complex faceted columnar structures and a variable polyhedral framework which are formed from deltahedra made from the basic modules of the embodiments of the present invention.

Figure 13B:
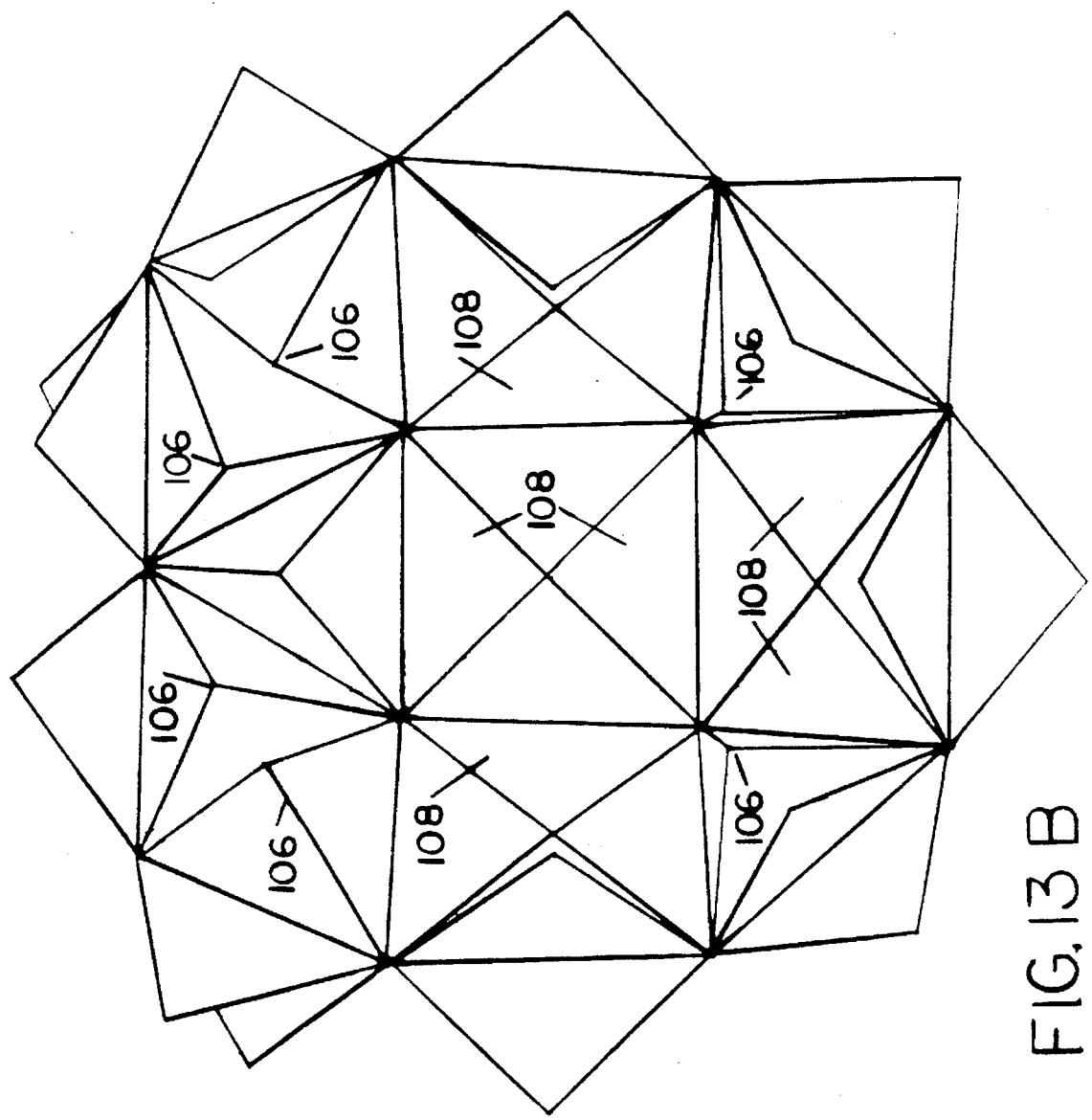
Figure 13C:
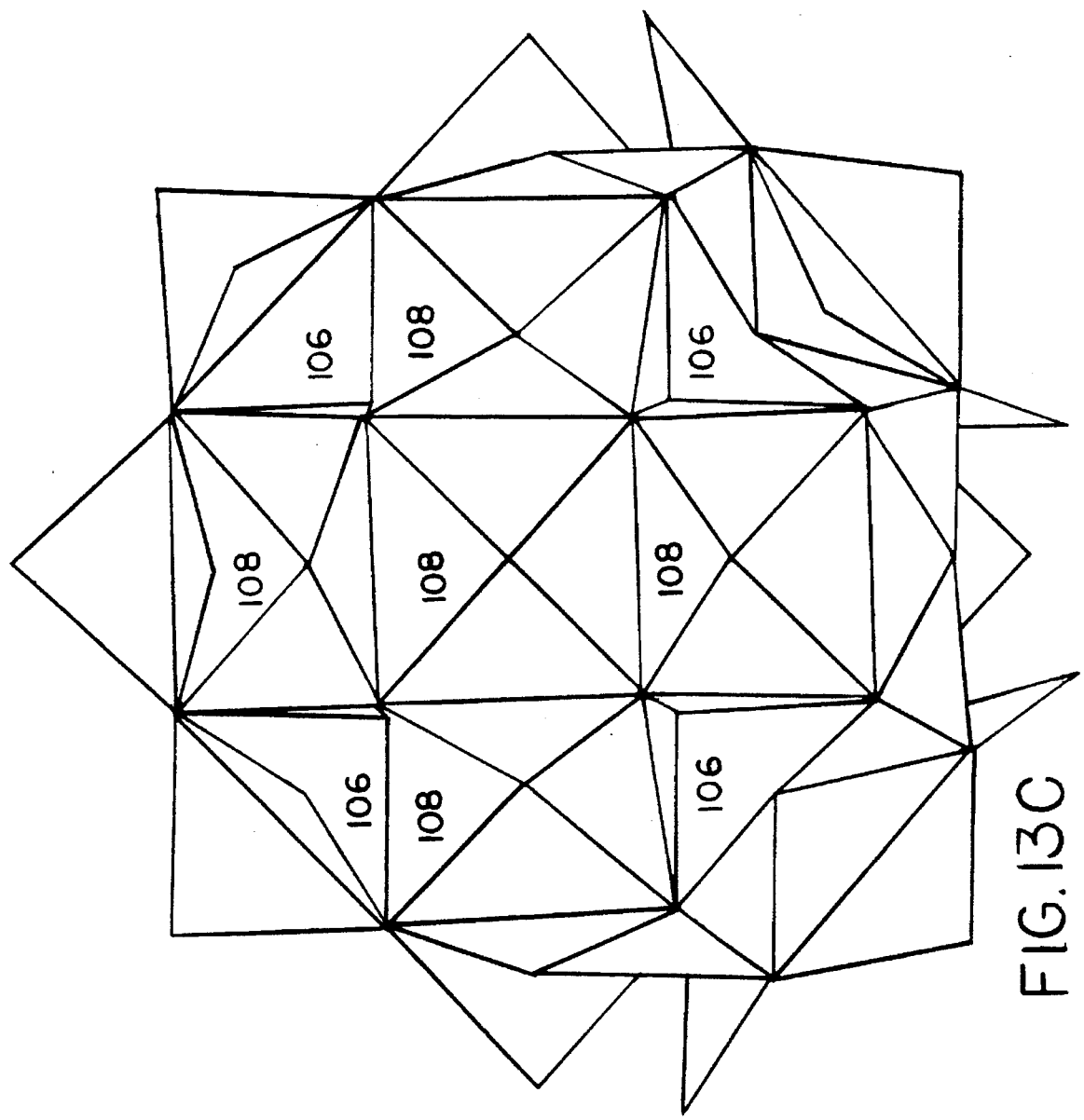

FIGS. 13A–13C shows a view of a complex substantially spherical framework formed of the joinder of shallow octohedra and deltahedra made from the basic modules of embodiments the present invention, as well as one variation of the framework.

Figure 14A:
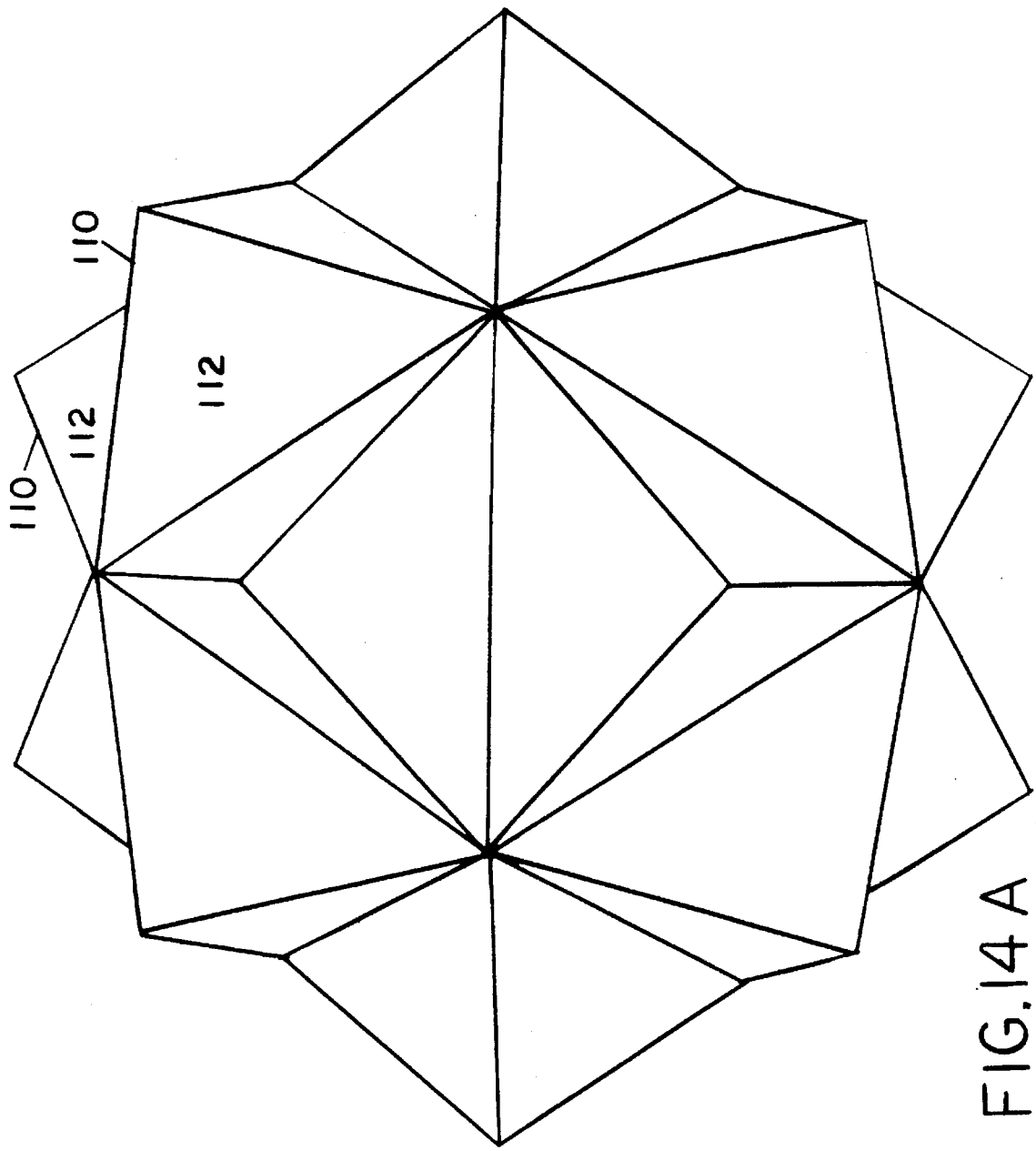

FIGS. 14A–14B show views of a structure made according to the embodiments of the present invention, which is a triakis icosohedron at its exterior and a great dodecahedron at its interior.

FIGS. 15A–15D show views of a three dimensional rectilinear grid of joined substantially spherical faceted frameworks, joined by sections of faceted substantially cylindrical frameworks.

Figure 16A:
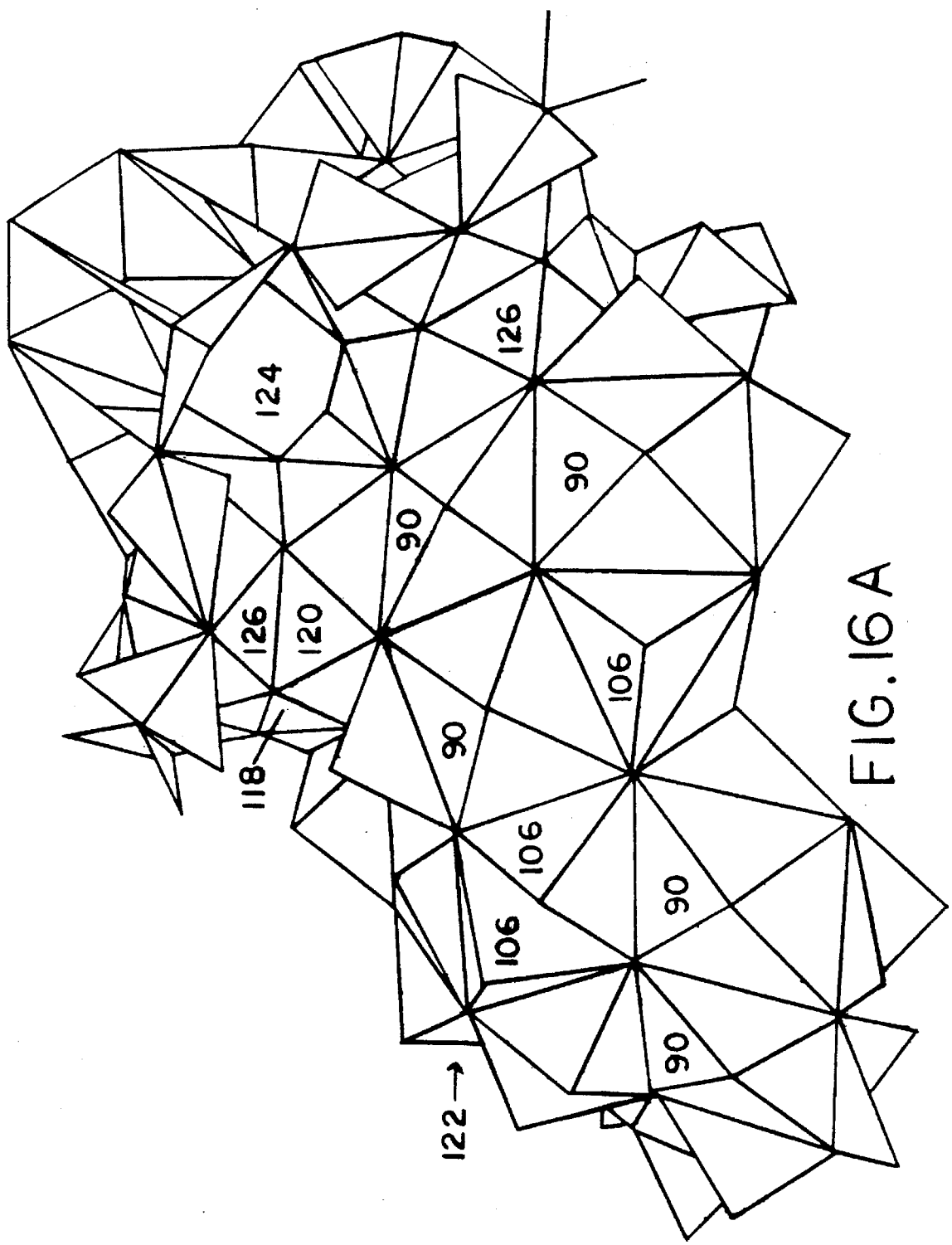
Figure 16C:
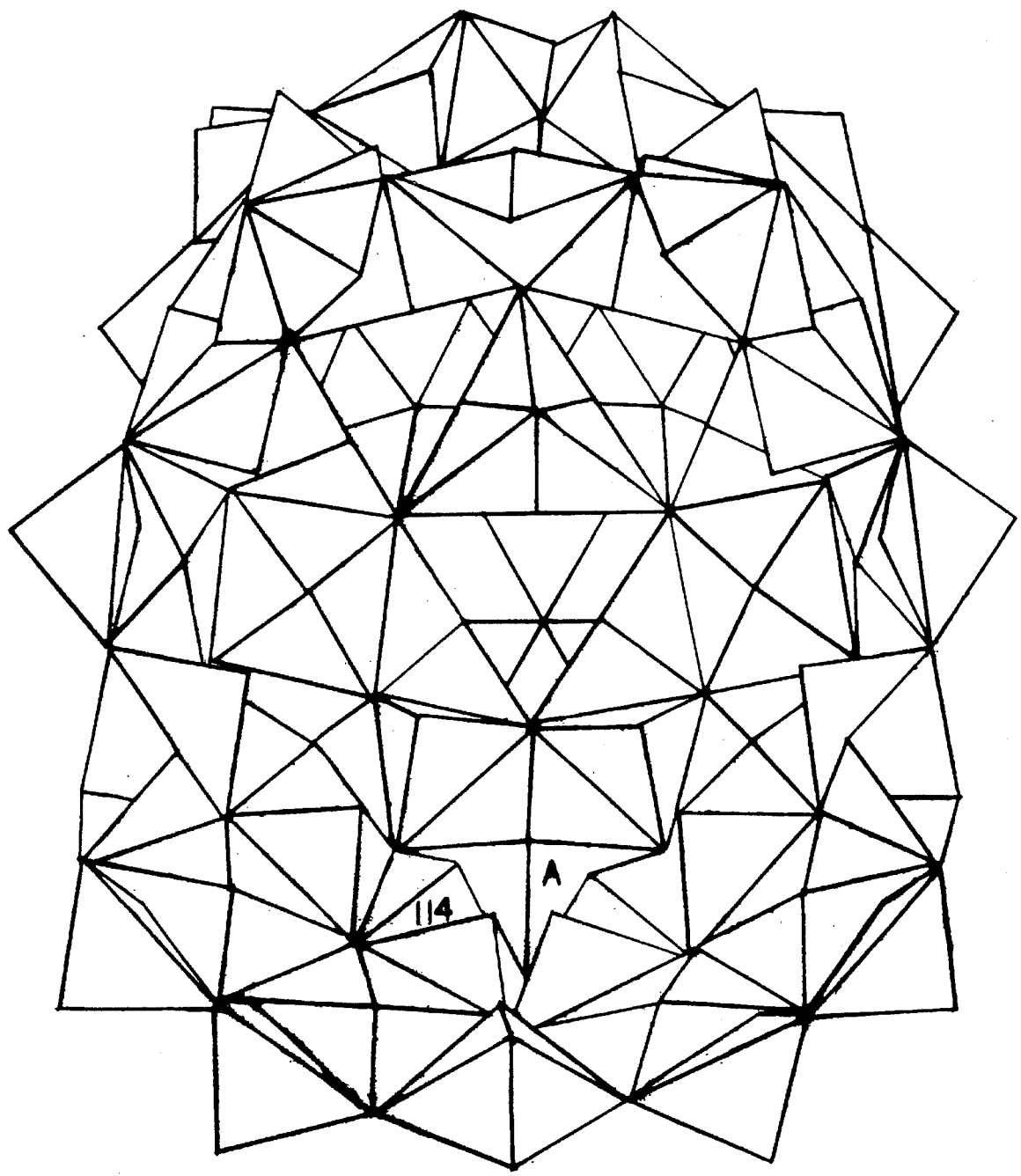

FIGS. 16A–16C show views of an very complex polyhedral structural framework, made from the embodiments of the present invention, having the form of four complex faceted substantially spherical structures joined together through a substantially tetrahedral manifold formed of the joinder of four faceted substantially cylindrical frameworks.

FIG. 17 shows a view of the joinder of two sections of rigid faceted substantially cylindrical polyhedral frameworks, joined across a flexible variable framework made from the identical structural subassemblies as the two rigid frameworks.

Figure 18:
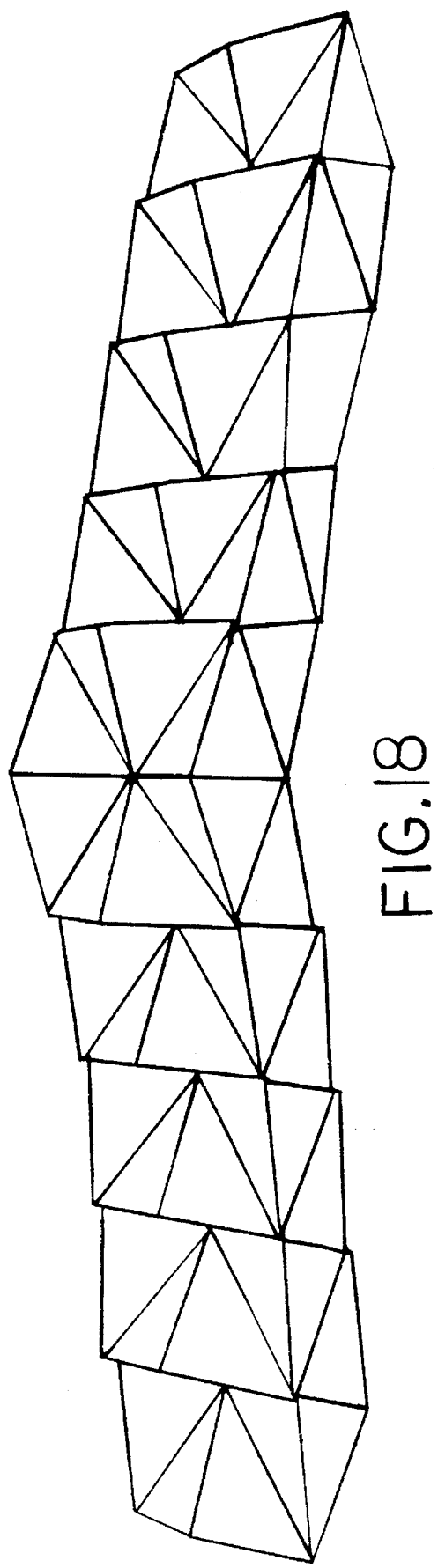

FIG. 18 is a view of an assembly of portions of shallow octohedral frameworks according to embodiments of the present invention, joined into a trusslike assembly.

REFERENCE NUMERALS IN DRAWINGS 10 base edge
12 side edges
14 hinge device (axis)
16 simple end
18 node device
19 base edge of polygon
20 connection process at vertex opposite hinge axis
21 side edge of polygon
22 additional hinge device
22A additional rigid connector
23 basic hinge
24 leaf
25 ends of hinge
26 annulus chamber
27 node
28 variable angle
30 cap closure
32 center bridge
34 strut truncation
36 break line for node
38 variable angle without physical hinge within panel
40 truncated panel line
42 polygonal panel
44 connection process at hinge axis
46 node connector
48 hinge axis
50 polygon anchorage connection device
52 barrels of hinge
54 octohedrons
56 10-sided deltahedrons
56A strut
58 6-sided deltahedrons
60 depression
62 joinder of 2 cylinders
64 bulkhead
66 faceted column alternate
68A faceted column
68B faceted column
68C faceted column
70 bearing edge portion of joinder 62
72 central axis of cylinder, center of bulkhead
74 center top
76 equilateral triangle
78 non-eqilateral triangle
80 dimpled in
82 dimpled out
84 faceted column
86 void adjacent dimpled in
88 void adjacent dimpled out
90 shallow octohedron
92 planar spaceframe
94 parasol-like roof
96 faceted cylindrical structure
98 faceted cylindrical structure
100 stiffener
102 octohedrons
104 continuous faceted linear ridges
106 tetrahedral-like structure
108 substantially square surface 110 non-base edge
112 protrusion
114 substantially spherical structure
116 faceted cylinder
116A bulkhead
118 three-stellate module
120 four-stellate module
122 substantially spherical structure
124 manifold
126 faceted cylinder
128 faceted cylinder
130 egg crate like structure

DESCRIPTION FIGS. 1–18

In the instant application a generic teaching is disclosed, utilizing one simple variable modular non-rigid structural element, which when combined with others of like kind, can yield a multitude of individual species of useful rigid geometric frameworks, forming a variety of engineering and architectural structures having discrete interior and exterior structures, all being easily clad using flat planar panels. In the instant application, several polygonal panels which may be frameworks or other structural devices are variably joined about a hinge axis thereby forming a hinged stellate, non-rigid structural module. In a preferred embodiment the sides of the three hingeably joined polygonal frameworks are made from struts of equal length, and several modules are combined to make a rigid polyhedral framework. In another preferred embodiment four hingeably joined polygonal frameworks having struts of not equal length form modules of which several are joined to make a rigid polyhedral framework. Therefore a non-rigid and hingeably variable, incompletely polyhedral module forms in conjuction with others of like kind a variety of rigid polyhedral frameworks. The teaching of the instant application discloses an incomplete polyhedral hinge wherein the non-hinge sides of the basic hinged polygons are used to join several of the modules together thereby progressively building up the new polyhedrons of the teaching of the present invention. The periodic adjustment of the angles of the several polygons of the basic module of the instant application in relation to each other create differing arrays of groupings of the basic stellate-hinged modules, thereby forming a new family of rigid complex polyhedrons.

FIGS. 1A to 1D show plan views of several typical embodiments of the basic hinged module.

FIG. 2 shows a perspective view of one typical embodiment of the basic hinged module, with a second module attached.

FIGS. 3A–3D shows an elevational view of a typical scheme for a multi-leaved hinge device showing the barrel of the hinge divided into separate segments for each of the four joined polygonal panels. 3A also shows one scheme with the addition of a ball and socket node located at an end of the axis of the hinge device. The leaves of the hinge device may be a single plane as in typical hinges, or may also be a pair of two parallel planes allowing the seating and connection of wall panels to the hinge leaves.

FIG. 4 shows a close-up cross sectional view of the node.

FIGS. 5A–5C shows some typical preferred polygonal panels and their hinge attachment, being both typical barrel-type hinges 52, and also ball and socket type devices 20 at a non-base edge , and 44 at a base edge, located at the vertices of edges of the polygonal wall panels.

FIGS. 6A–6B shows a basic polyhedron formed from embodiments of the present invention, being the joinder of five octohedrons 54, to two ten-sided deltahedrons 56, such that the discrete geometric forms at the exterior of the polyhedrons are the inverse of the additional discrete geometric forms at the interior of the polyhedron. The inverse at the interior is shown in FIG. 6C. This is a typical feature of the teaching of the present invention, in that several of the structures of the present invention have an interior which is either the exact inverse of the exterior form or a substantially identical reverse of the exterior forms. In some cases the interior edges of the inverse forms all meet at one point such as in the interior of FIGS. 6A, 7, forming structures of complete triangulation which have extreme rigidity and strength. In some other cases the inverse edges do not all meet at a point, still forming useful structures of great strength, which may be additionally stiffened with additional linear struts. This basic polyhedron of FIGS. 6A and 6B is formed of the basic module of the present invention having three equilateral triangular polygonal panels joined about a hinge device 14.

A further variation, 56A at the perimeter of this polyhedron between the apices of the exterior projections of the octohedrons yields a modified structure having the same number of sides as the original polyhedron. This polyhedron, 6A, 6B has two preferred embodiments. In the first, when all edges of the polygons from which the stellate-hinged module is formed are equal, the polyhedron formed will have 30 sides at its exterior 30, and at the interior all edges meeting at a single point, as in FIG. 6A, 6B. A second embodiment polyhedron is formed of stellate-hinged modules having other types of polygons with non-equal edges thereby having thirty sides at each the exterior and the interior, but all edges at the interior do not meet at a single point. Such a structure may also be additionally stiffened with linear struts. FIG. 6A is a perspective side view of this basic polyhedron looking towards one apex of one of the octohedrons at the exterior of the polyhedron. FIG. 6B is a top plan view taken along line 1—1 in FIG. 6A. FIG. 6C shows the interior of the structure of 6A showing all of the linear edges of the polygons meeting at a single point.

Figure 7A:
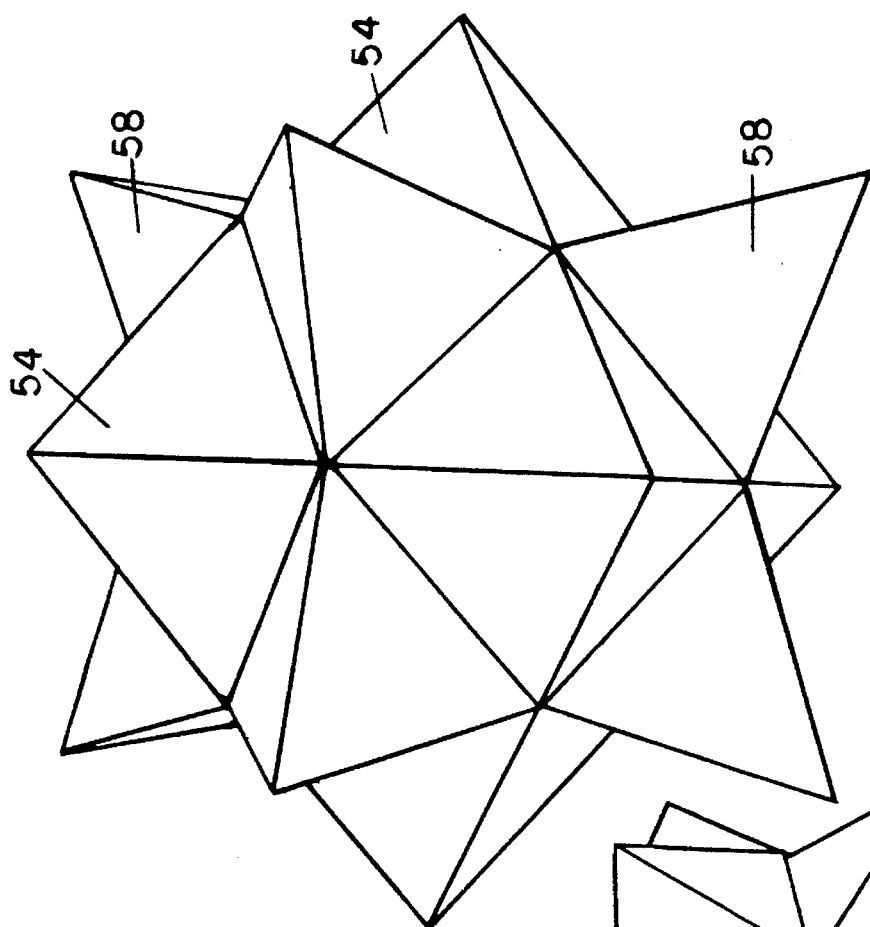
FIG. 7A shows an additional basic complex polyhedral structure formed from embodiments of the present invention.

FIG. 7A shows another basic polyhedron formed from the teaching of the present invention, being the joinder of six octohedrons 54, and eight, six-sided deltahedrons 58, such that the discrete geometric forms at the exterior of the polyhedrons are the inverse of the additional discrete geometric forms at the interior of the polyhedron. This polyhedron is a 48-sided concave deltahedron at its exterior. All edges of the structures at the interior of the polyhedron substantially meet at a single point. This polyhedron is formed entirely of the basic stellate-hinged module of the present invention having three polygonal panels formed of equilateral triangles stellately joined about a hinge device. The overall form of this polyhedron as formed by the adjacency of the base corners of the octohedrons at the exterior is a larger octohedron with additional tetrahedrons located at the center of the faces of the exterior triangular sides of the octohedron. A further truncation of this polyhedron yields a tetrakis hexahedron. This feature is similar to the device of FIGS. 14A & 14B later described, having a further truncation of their exterior yielding an icosahedron from a triakis icosohedron having a great dodecahedron at its interior.

The 48-sided polyhedron FIG. 7A may be used at the interior of other structures according to the present invention for example the faceted columnar structure 17.

Figure 7B:
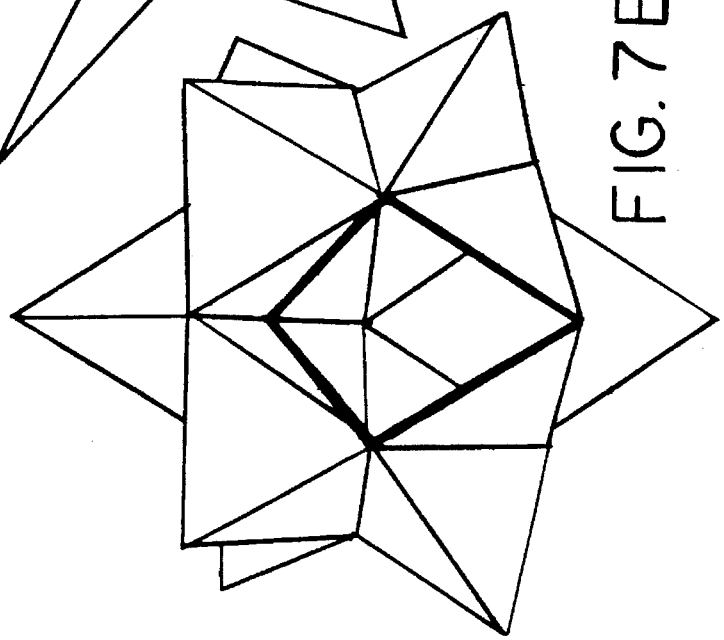
FIG. 7B shows a cut-away view of a part of the interior of the structure of 7A.

FIG. 7B shows the interior of the structure of FIG. 7A, showing all of the linear edges of the polygons meeting at a single point.

Figure 8A:
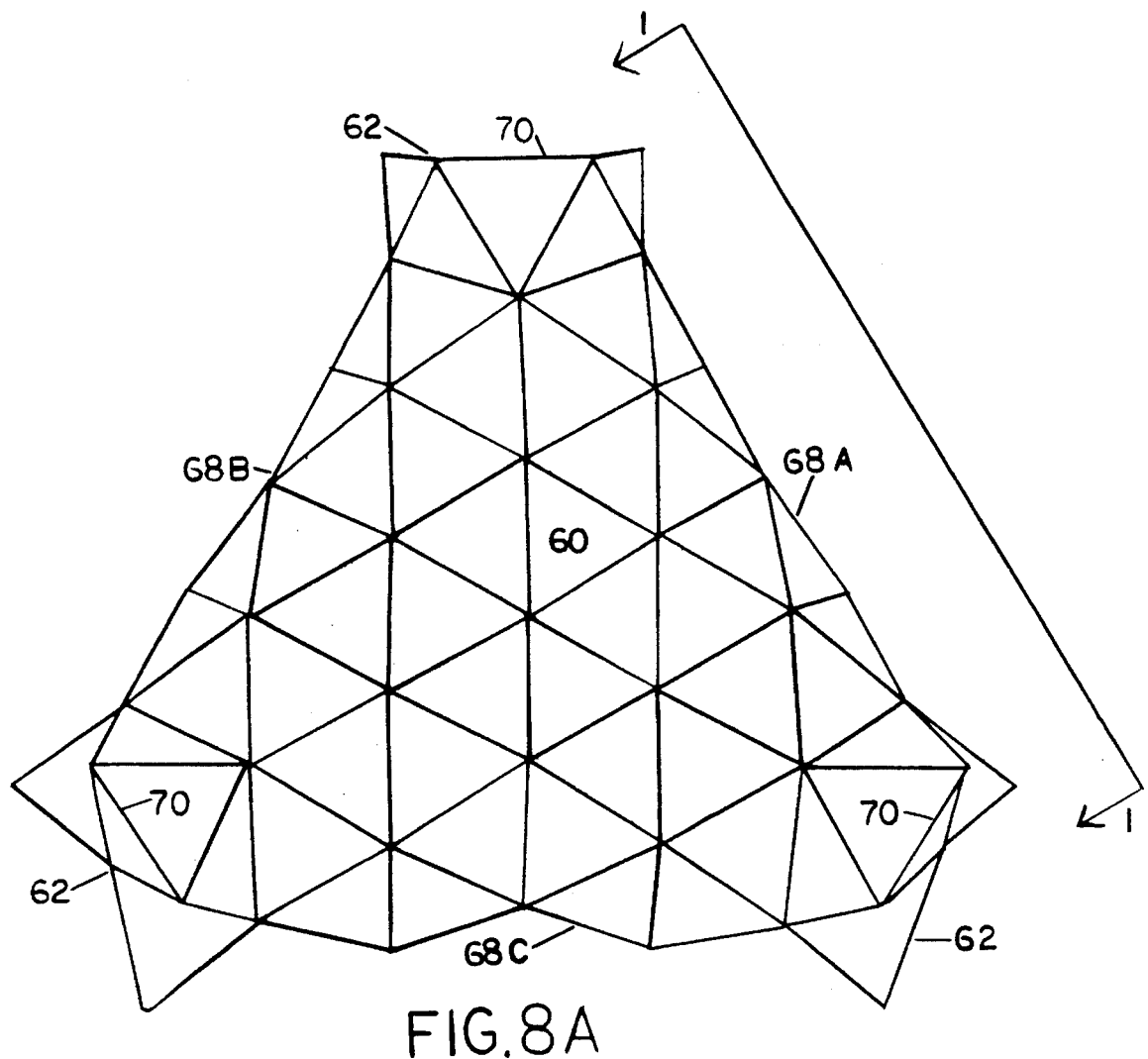
FIGS. 8A–8C shows a complex polyhedral structure being the joinder of three faceted cylindrical structural frameworks.

FIG. 8A is a top plan view of complex structure according to embodiments of the present invention. This structure is formed of the joinder of three faceted cylindrical columnar structures 68A, 68B, 68C. Faceted cylindrical columnar structures are one of the recurring forms of the teaching of the present inventions and will occur in several different structures according to the instant application. A depression 60, naturally occurs at the center of this structure where the three cylinders abutt each other.

Figure 8B:
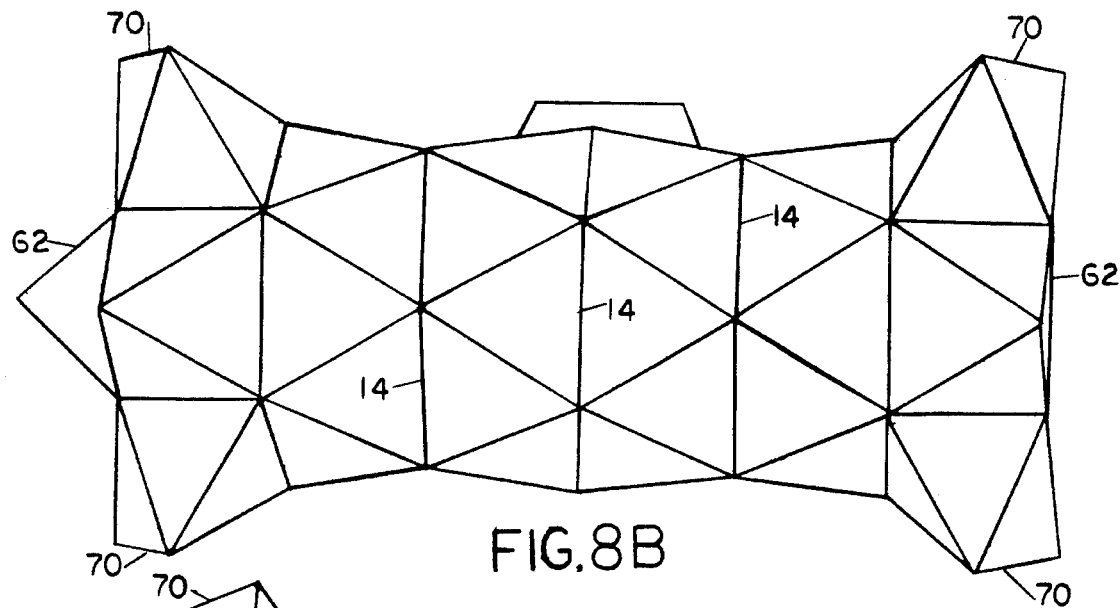
Figure 8C:
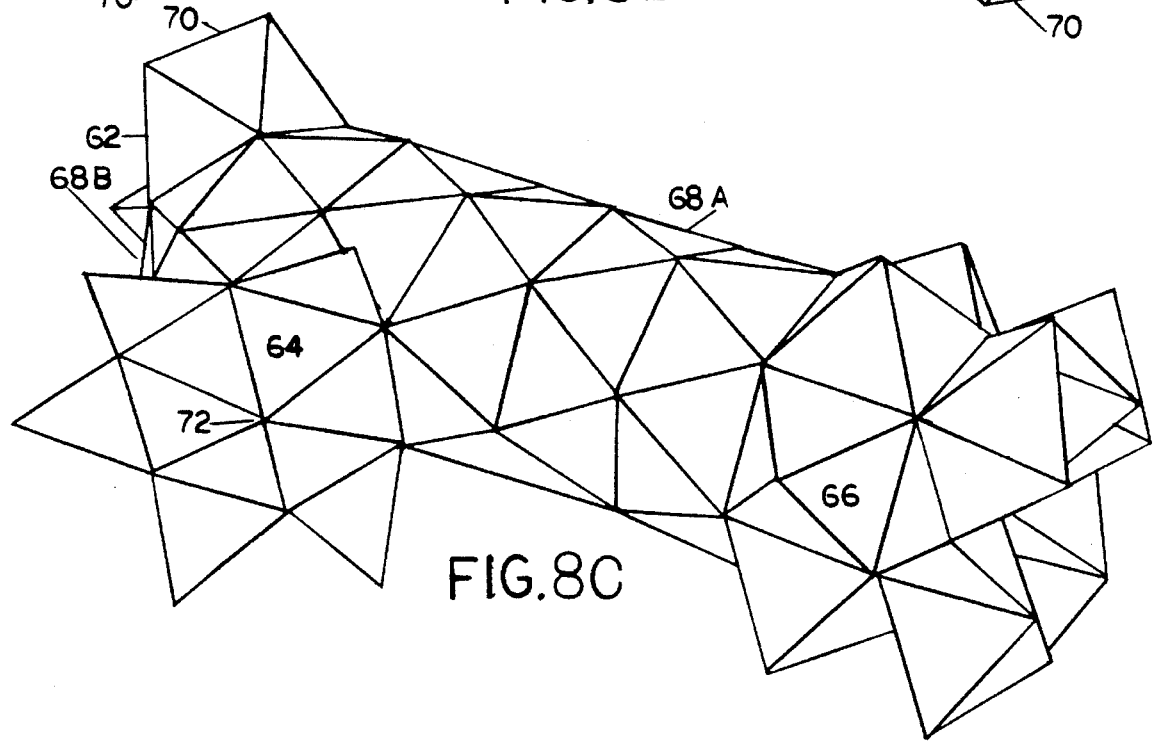

FIG. 8B is a perspective side view taken along line 1—1 in FIG. 8A. The connection at the corners of the joinder of the three faceted cylinders is shown at 62. The bulkheads 64 at the interior of the cylinders, which are formed of initial polygons according to embodiments of the present invention, are shown in FIG. 8C, which is a perspective partial section of the structure of FIG. 8A, showing one faceted cylinder 68A, a portion of an additional adjacent connected cylinder 68B with its interior bulkhead 64 exposed, and instead of the standard joinder 62 of two cylinders, an alternate form of the faceted columnar structure 66 is shown. The faceted cylindrical structures are stiffened at their interiors by multiple bulkhead structures 64 at the interior of the structure located normal to the central axis 72 of the faceted cylinder at each of the several hinge axes 14 of the basic stellate modules. Each of the joinder structures 62 has an edge 70 which is oriented in a plane parallel to the central axis 72 of the three faceted cylinders, a point of which axis can be seen at the central point 72 of the bulkhead 64. This allows the useful feature of providing the edge 70 to be a bearing surface for the entire structure 8A, and in addition allows multiple structures 8A to be stacked on top of another abutted and joined at edges 70, and also keeps the exterior surfaces of the faceted cylinders of structure 8A away from the bearing edges 70, thus creating an additional space between the structure and its bearing ground or an adjacent joined similar structure. The structure of FIG. 8A is formed entirely from the initial polygons being equilateral triangles joined in a three-stellate-hinged module. At each bearing edge 70 however, one polygon of the three-stellate module is removed. If the length of the faceted cylinders 68A, 68B, and 68C is increased, the depression 60 at the center of the structure will become a void space being the empty space formed between the three adjacent faceted cylinders. The greater the length of the cylinders so formed, the larger the void space will consequently become.

Figure 9A:
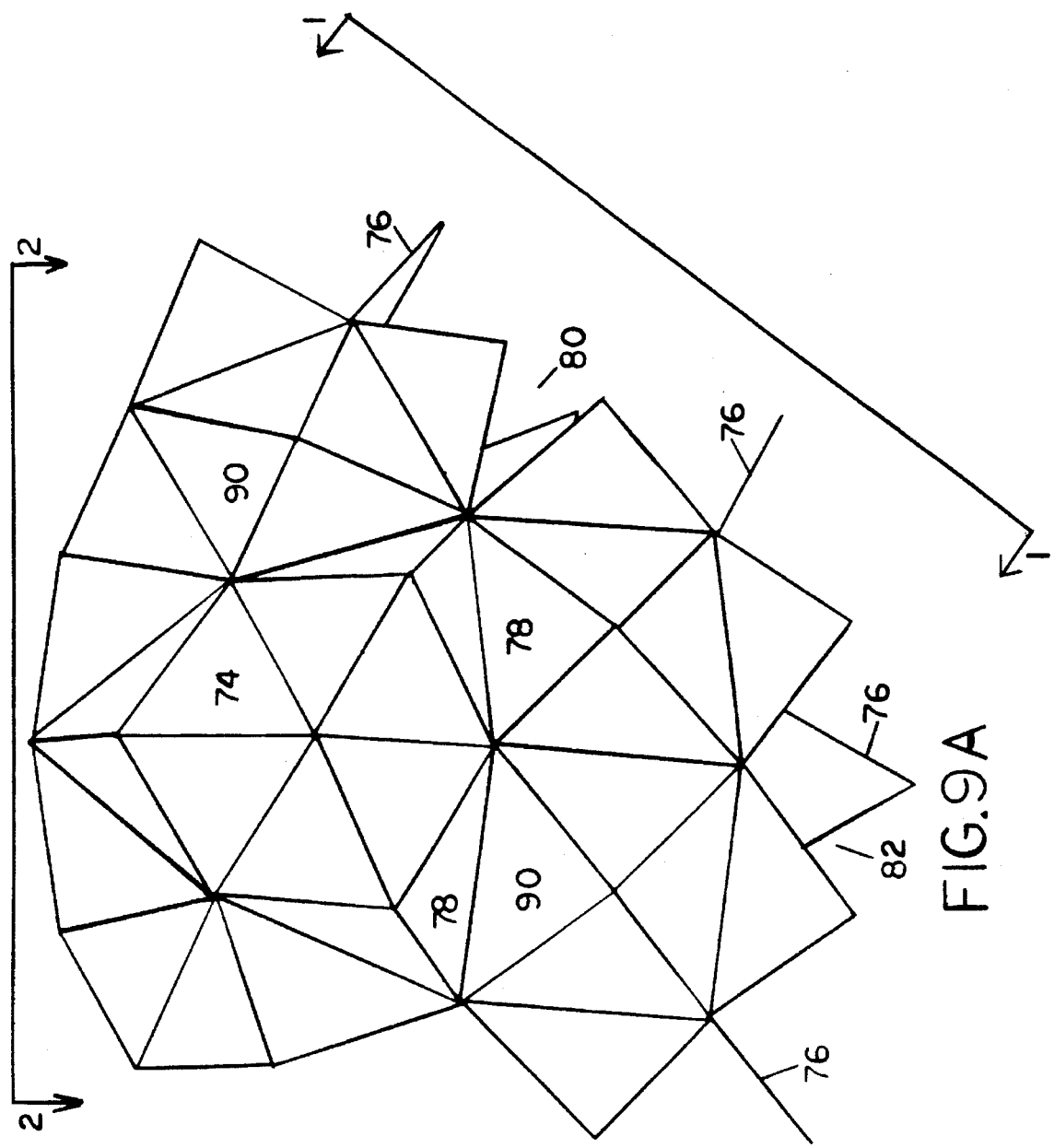
Figure 9B:
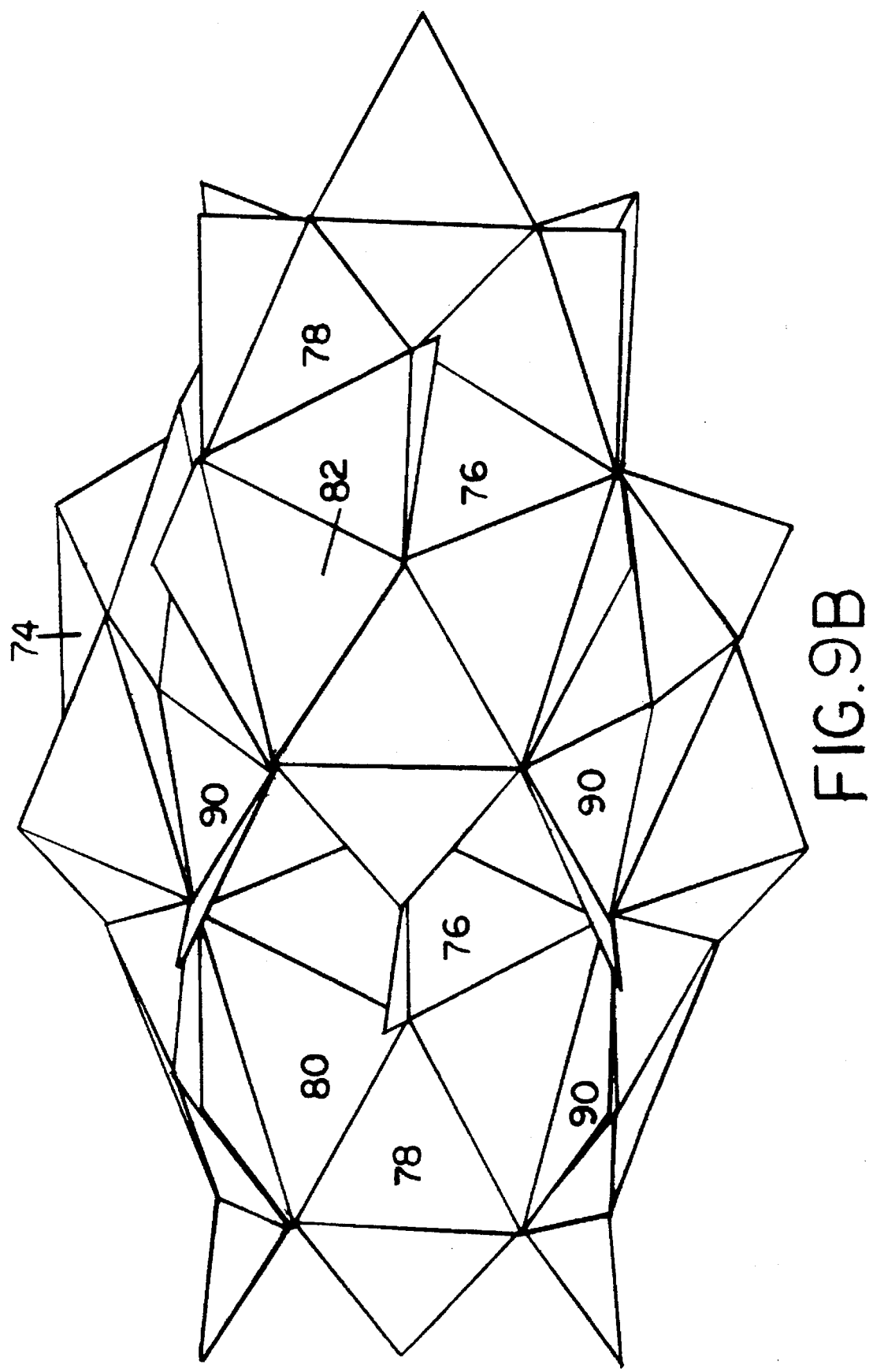

FIG. 9A shows a top plan view of a portion of an exterior of a complex structure according to the present invention. The center of the top of the structure 74 is formed of a concave shape made of 6 equilateral triangles being visible portions of three stellate modules according to the teaching of the present invention. Spreading out from the center of structure 9A are attached additional stellate modules according to the present invention, made from initial polygons being both equilateral triangles 76, and non-equilateral triangles 78. On the exterior of the structure shallow octohedral forms 90 are shown which form a part of the faceted, complex, substantially partially spherical exterior of the structure. FIG. 9B is a perspective side view taken along line 1—1 in FIG. 9A. This polyhedron is very complex in shape having several alternate forms, one of which is shown in 9B. In the preferred embodiment shown in FIG. 9B, two partially enclosed spaces 80 & 82 are shown. One of these enclosed spaces 80 is dimpled inwardly towards the interior of the structure and the other 82 is dimpled outward toward the exterior of the structure. These two enclosed spaces are at their shown perimeters formed of the same initial polygons and both are comprised of identical stellate modules according to embodiments of the present invention. A total of 6 such enclosed spaces are located about the top central portion 74 of the structure, only two of which are shown in view 9B. These 6 enclosed spaces complete a first layer of enclosure at the exterior of the structure shown in 9B. Additional different enclosed spaces formed of the basic stellate modules may continue to add on to the perimeter variously completing the structure of FIG. 9A. FIG. 9B therefore shows one exterior layer of a structure formed of embodiments of the present invention. This complex polyhedron is formed from stellate modules made from both equilateral triangular and non-equilateral triangular polygons. The opposite discret interior side of the shallow octohedral structures 90 and the structure 74 are located at the interior of the structure of FIG. 9A are shown in FIG. 9B. These shallow octohedral structures are made from non-equilateral triangular polygons and are an element which occur in many of the different structures according to the present invention. FIG. 9C is a perspective side view taken along line 2—2 in FIG. 9A. FIG. 9C shows the interior of the complex polyhedron. At the interior of this polyhedron is a faceted columnar structure 84 which connects to the underside of the top central form 74. The faceted column 84 connects at each of its ends to a similar structure 74, thereby making a symmetrical structure. The form of the structure of FIG. 9C shows a column structure 84 connecting to a top structure 74 which spreads out to complete the entire structure in a form which is parasol-like. A faceted interior column structure attached to a faceted partially spherical parasol-like exterior structure is a geometric form which appears in several different embodiments as shown below in the present invention. In FIG. 9C the interior of the structure shows several void spaces or rooms which are located behind and adjacent the dimpled void spaces abovementioned, and are formed of the inverse geometries of the exteriror forms shown in FIGS. 9A and 9B. The inward dimpled space 80 has the interior void space 86 located adjacent to it. The outward dimpled space 82 has the interior wide space 88 located adjacent to it.

FIG. 10 A shows a top plan view of a structure according to the present invention made entirely of modules formed of 4-stellate non-equilateral triangular polygons joined about a hinge axis. These modules form multiple shallow octohedrons 90 which are joined together to form a planar spaceframe structure. FIG. 10 B is a perspective side view taken along line 1–1 in FIG. 10 A. Two planar spaceframe structures 92 are joined together by additional shallow octohedrons 90 A, 90 B, some oriented normal, 90 A, to the planar spaceframes, some oriented parallel 90 B, to the plane of the spaceframe, to form the space enclosure shown in FIGS. 10A and 10B. Eight shallow octohedrons alternating in their orientations to the planar spaceframes 92, being alternately normal 90 A and parallel 90 B to the plane of the spaceframe, form a ring which is located between the two parallel spaceframes 92.

FIG. 11 A is a exterior top plan view showing a structure according to the present invention having a central area 94 formed of 5 basic 3-stellate modules according to the instant application using equilateral triangular polygons. As the structure spreads out from the top center, additional similar modules 94 A are added to continue the structure, thereby forming a faceted substantially parasol-like form at the top of the structure.

Figure 11B:
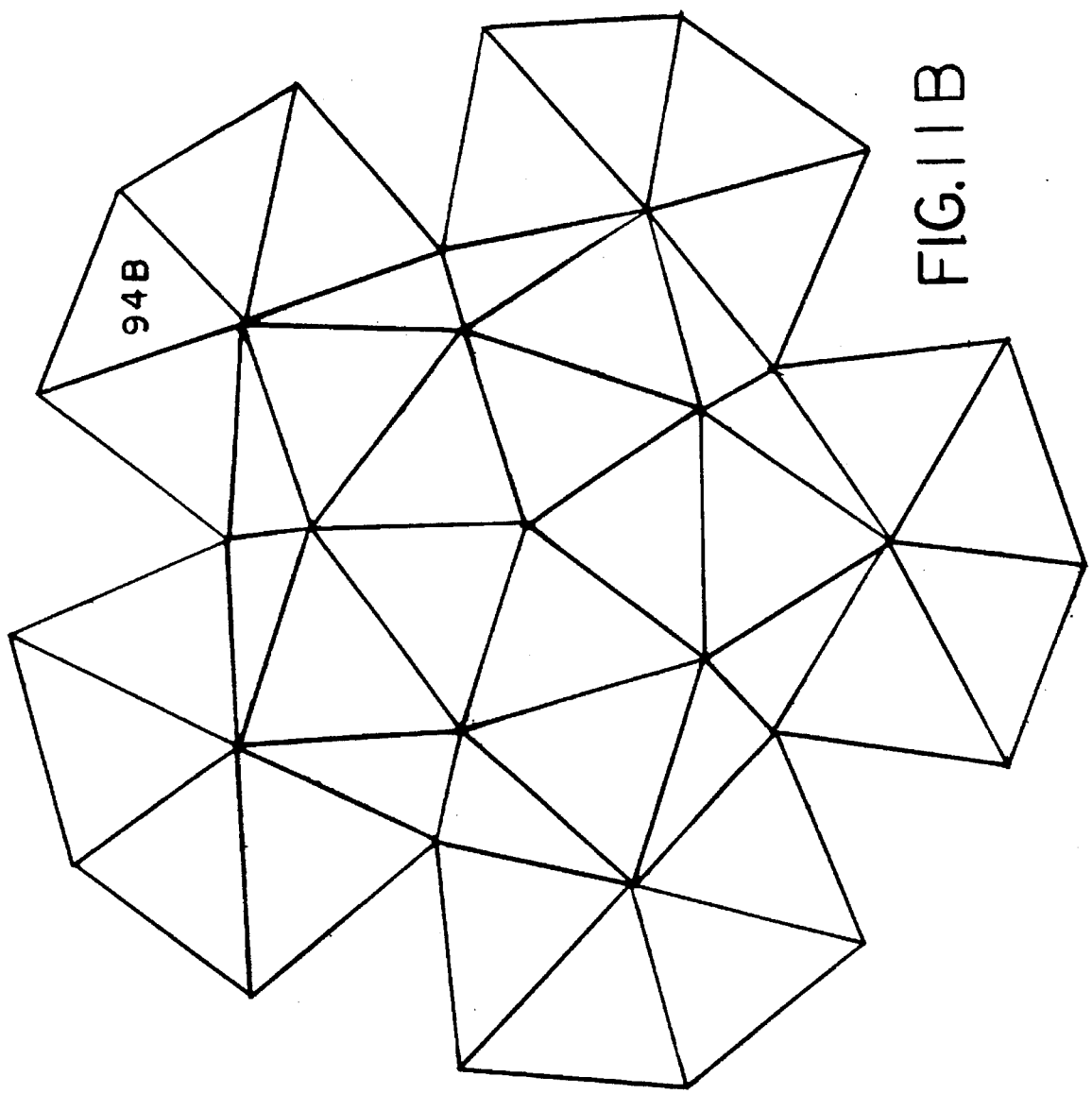

FIG. 11B is a structure similar to that of 11A, but terminating at its top perimeter in a different array with similar modules 94B turned at an angle to the previous layer of modules.

Figure 11C:
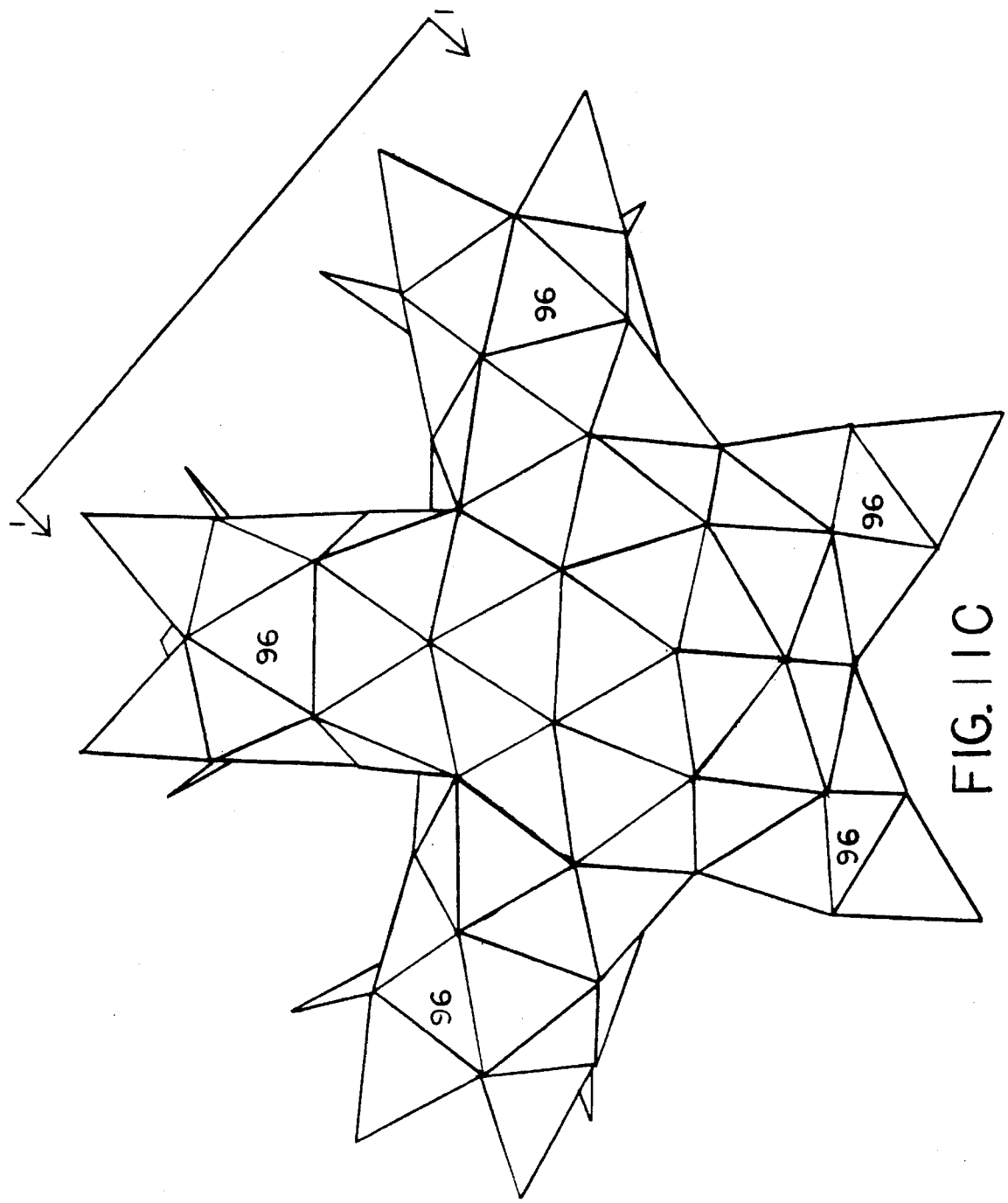

FIG. 11C is a top view perspective exterior plan similar to the structures of FIGS. 11A and 11B, however 5 additional faceted cylindrical structures 96 are formed attached about the top center parasol-like structure forming a complex structure according to the present invention.

Figure 11D:
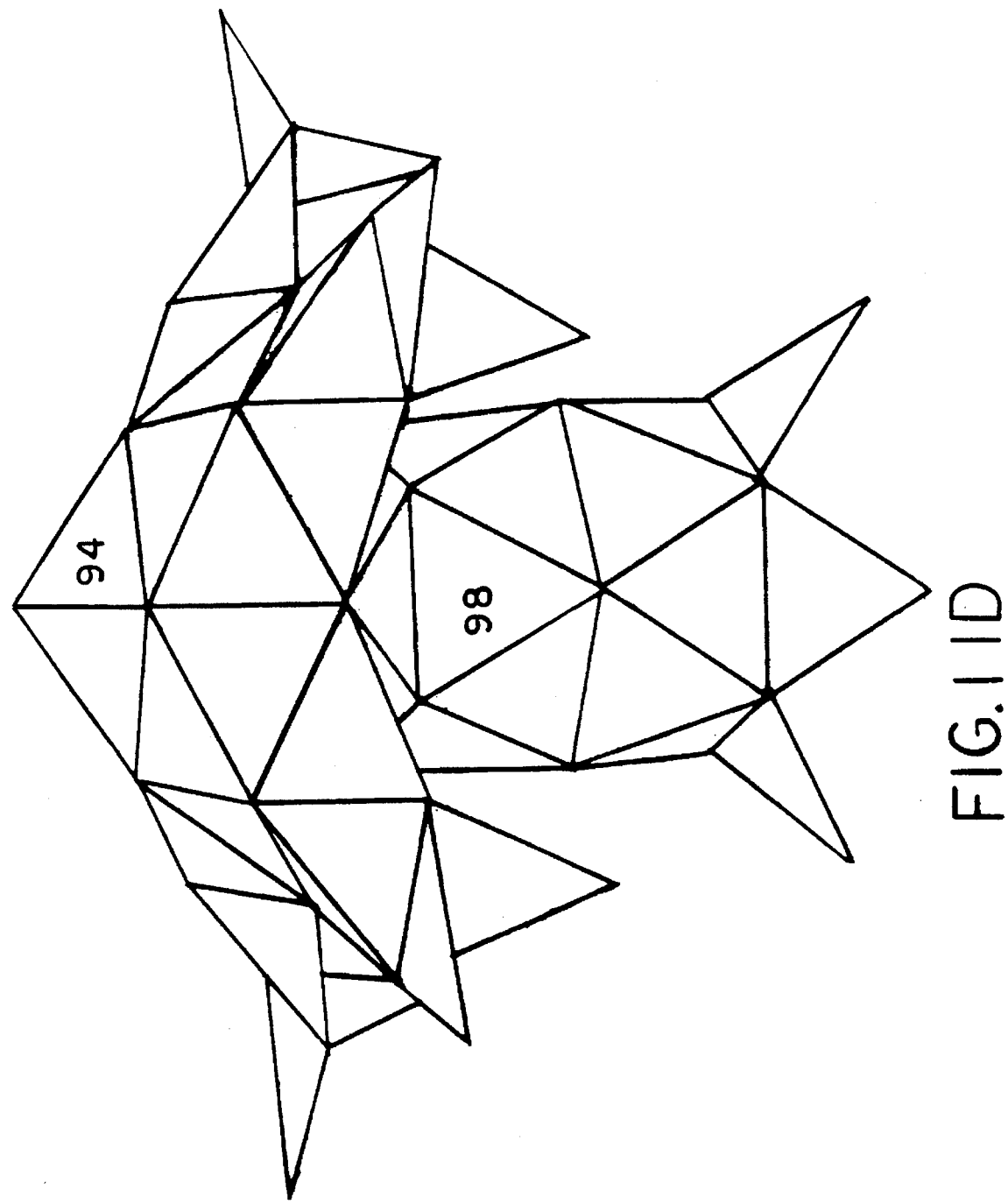

FIG. 11D is a side perspective view taken along line 1—1 in FIG. 1C showing a portion of the interior of the structure. A central faceted columnar structure 98, having interior bulkheads radially formed by adjacent abutted polygons of the instant application is shown connected to the interior underside of the top central area 94 to complete a parasol-like structure, wherein the roof of the parasol is the top central area 94 and its surrounding structures, and the central column of the parasol-like structure is the faceted column 98.

Figure 11E:
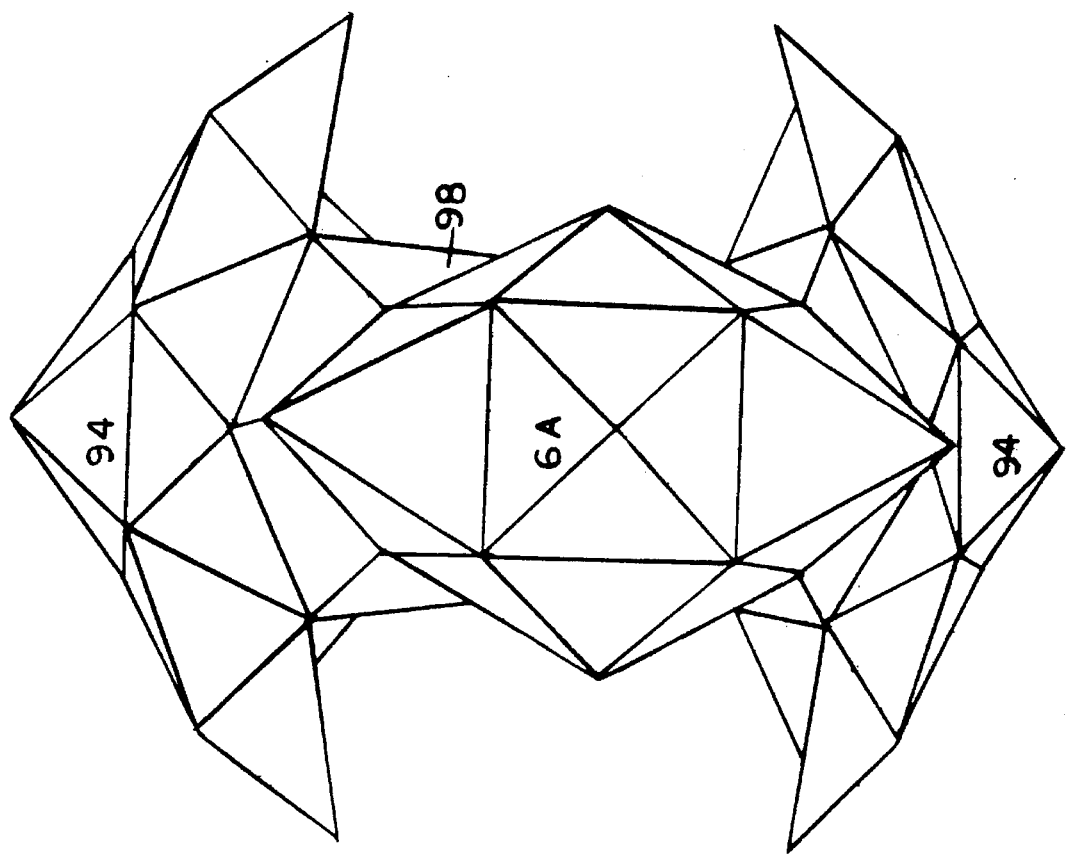
Figure 11F:
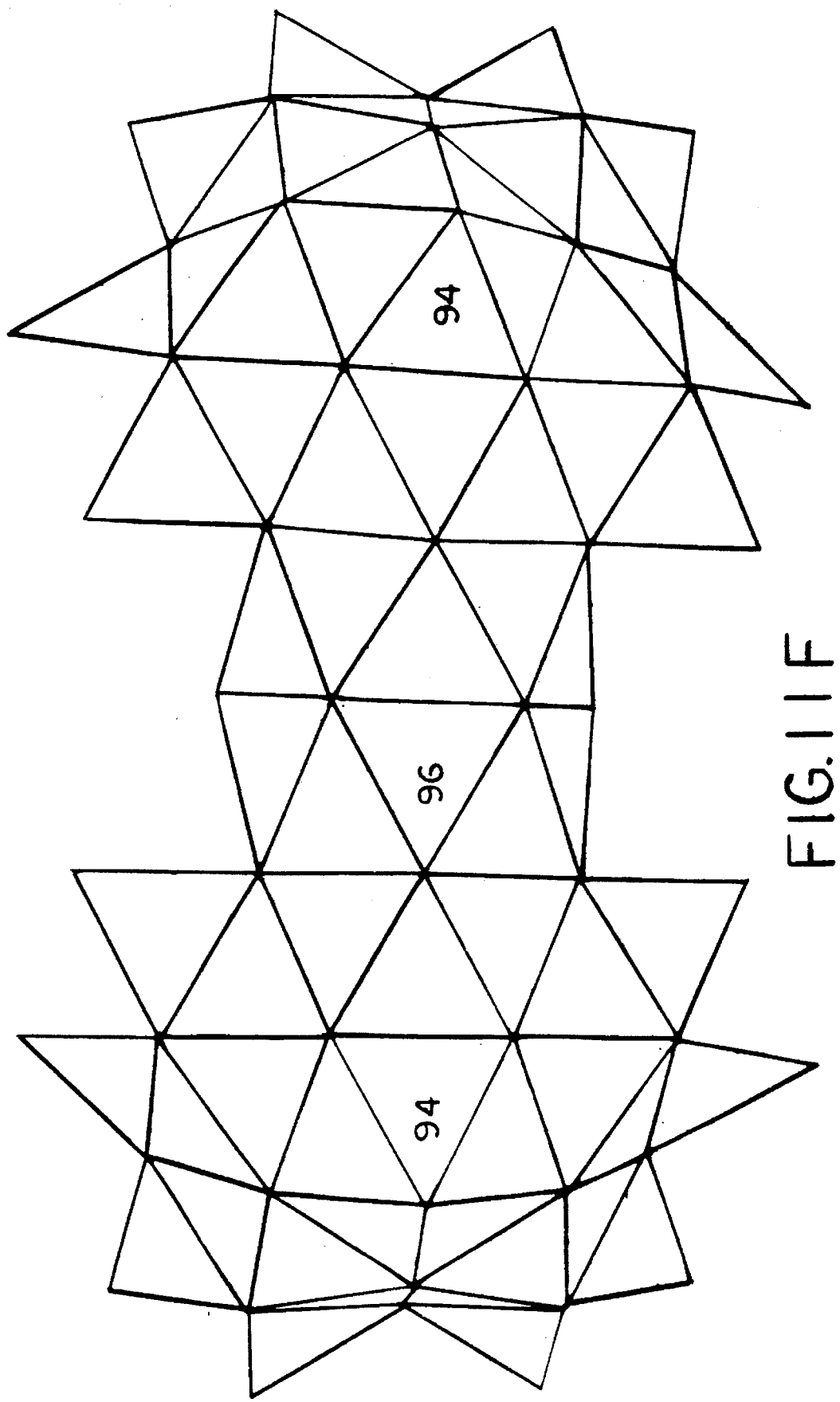

FIG. 11E is a similar structure to 11D with a top center parasol roof-like structure 94 formed at each end of the central faceted columnar structure 98. An additional structure similar to FIG. 6 A is shown joined to the structure of FIG. 11E.

FIG. 11 F is a structure showing the joinder of 2 structures similar to the structures of FIG. 11A, joined so that two top center areas 94 are located substantially adjacent to each other by a portion of a faceted cylindrical structure 96.

FIG. 12 A is an exterior perspective view of a faceted cylindrical structure according to the present invention. The structure is formed entirely of 4-stellate-hinged modules using non-equilateral triangular polygons. Additional stiffening members 100 may be added to strengthen the structure. The form of the structure is that of multiple adjacent tetrahedrons. The interior of the structure is the inverse of the exterior, having identical edges and sides but reversed inwardly, so that the exterior exposes one half of the tetrahedrons of the structure, being the exposed tetrahedrons 102, and the interior being the inversed remaining half of the tetrahedrons, thereby tetrahedral forms being at the interior of the structure 12A.

FIG. 12B is an additional faceted substantially cylindrical structure according to the present invention.

FIG. 12B is a perspective view of a faceted substantially cylindrical structure according to the present invention. The structure is similar to the structure of FIG. 12A, but having a different array pattern of the initial 4-stellate-hinged modules used to form the structure. Additional stiffeners 100 may be added as required.

FIG. 12C is a planar space frame-like structure according to an embodiments of the present invention. It is formed entirely of 4-stellate-hinged modules made of non-equilateral triangles. Additional stiffeners 100 may be added as required. It is formed of multiple adjacent joined tetrahedral forms 102 similar to the structure of FIG. 12B, so that at the exterior of the structure a tetrahedral form is shown and at the interior of the structure the opposite inversed geometry is formed being a tetrahedral form. The devices of FIGS. 12 A, 12B, and 12C are all formed from the same indentical basic modules. The geometric array of the forms of FIG. 12 B is different than the array of FIG. 12A and 12C, such that the distances between the several adjacent different tetrahedrons is varied.

FIG. 12C is a top plan view of a substantially planar space frame structure according to a embodiment of the present invention. It is formed entirely of 4-stellate-hinged modules made from non-equilateral triangular polygons. It is identical in structure on each side of its plane of symmetry. It is formed of adjacent tetrahedral structures joined across a plane of symmetry into six-sided deltahedral structures which are joined at their base edges. This is the form of the applicants issued U.S. Pat. No. 4,864,796 for Variable Polyhedral Framework, issued Sep. 12, 1989.

The joinder of several adjacent tetrahedrons along their base edge may be accomplished by a nodal connection 46 at the vertice or may be accomplished by the connection at the base edges by a typical barrel hinge 14 of the prior art as above-described in the basic form of embodiment of the present invention, and shown in FIGS. 2, 4, and 5A, 5B, and 5C.

FIG. 13 A is an exterior perspective view of a structure according to an embodiment of the present invention having a complex form being a substantially faceted spherical structure formed entirely of 4-stellate-hinged modules according to embodiment of the present invention made from non-equilateral triangular polygons. The structure has some areas formed into tetrahedral-like structures 106, and some areas where continuous linear faceted ridges run along the exterior of the structure 104, having polygons adjacent to them along their length. The structure of FIG. 13A is deeply trussed by its particular geometry and is extremely rigid and resistant to loading.

FIG. 13B is a perspective interior view of the structure of FIG. 13A. Shown are tetrahedral structures 106 and substantially flat square areas 108.

FIG. 13C is a structure similar to the structure of 13B but showing a different array pattern of the forms comprising the structure. FIG. 13C is a more symmetrical structure than 13B having more forms 108 and fewer tetrahedrons 106.

FIG. 14A is perspective view of the exterior of a special form of a triakis icosohedron formed according to the instant application of 4-stellate-hinged polygonal modules made of non-equilateral triangular polygons. The non-base edges 110 of the tetrahedral protrusions 112 forming the exterior of the structure are coplanar, so that the structure may seat itself on a stellate form of 5 linear foundation lines formed of edges 110. This is the structure of the applicant's prior U.S. Pat. No. 4,682,450 for Combinate Polyhedra, issued Jul. 28, 1987.

FIG. 14B is a perspective view of the interior of FIG. 14A showing the geometric form of a great dodecahedron. The areas 114 show the adjacency but not joinder of tetrahedral forms comprising a portion of the interior of the structure. The vertices of the several groupings of these tetrahedrons at the interior of the structure are coplanar due to the coplanar orientation of the edges 110 at the exterior of the structure in FIG. 14 A, and the essential symmetry of the structure.

FIG. 15 A is an exterior perspective of a structure according to the instant application formed entirely of 4-stellate-hinged polygonal modules made of non-equilateral triangular polygons. The Figure shows two identical faceted substantially spherical structures 114 joined together by the junction of each to a faceted substantially cylindrical structure 116. Additional structures 116 are located on rectilinear axes allowing the entire structure to form a rectilinear grid of faceted spherical structures. Structures 116 have internal bulkheads formed from the initial polygons of embodiments of the present invention shown at the exposed interior of the cylinders 116A. FIG. 15 A shows a structure which is symmetrical and therefore may be extended along its axes so that a continuous grid of structures 114 may be joined by structures 116.

Figure 15A:
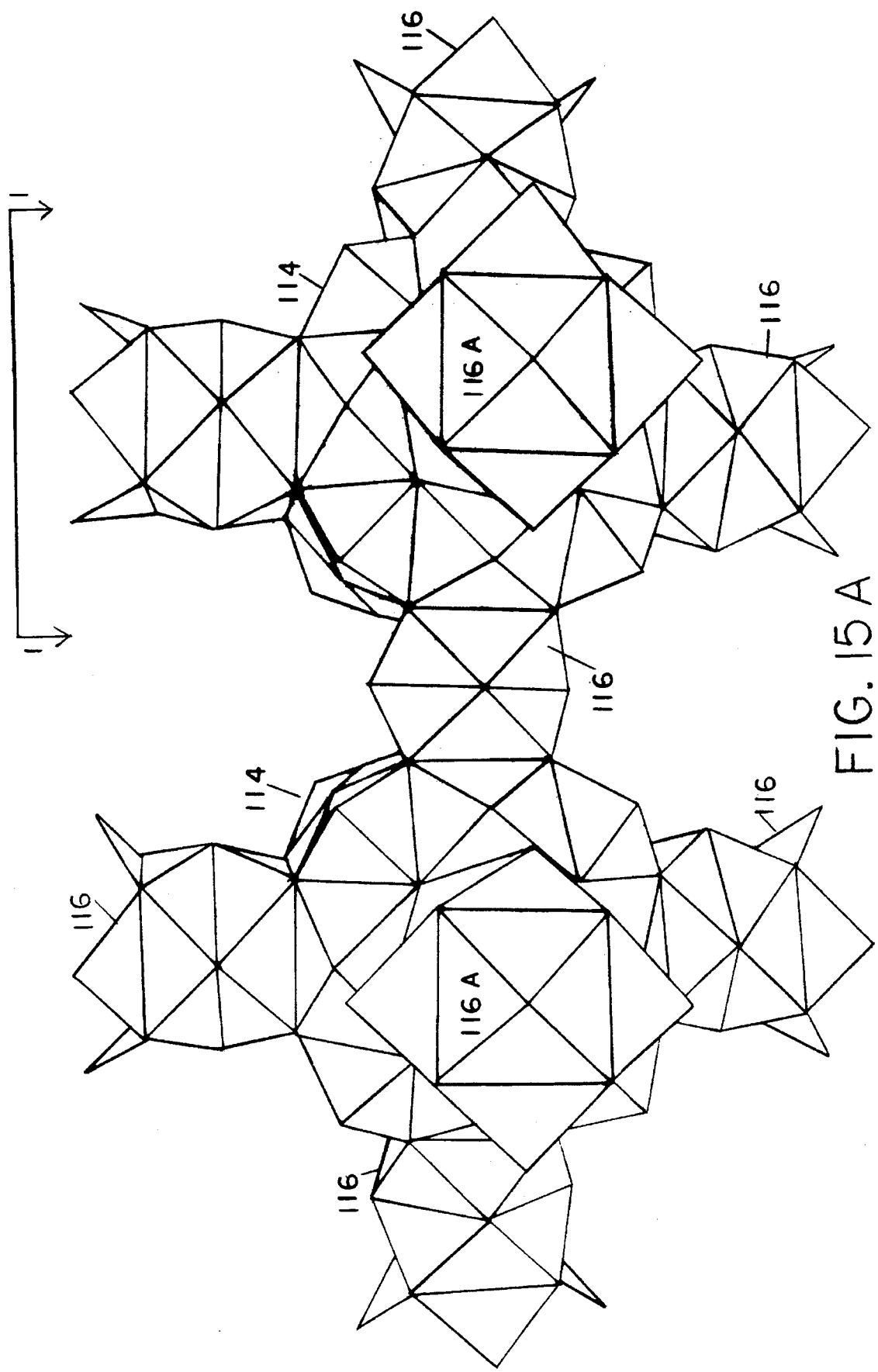
Figure 15B:
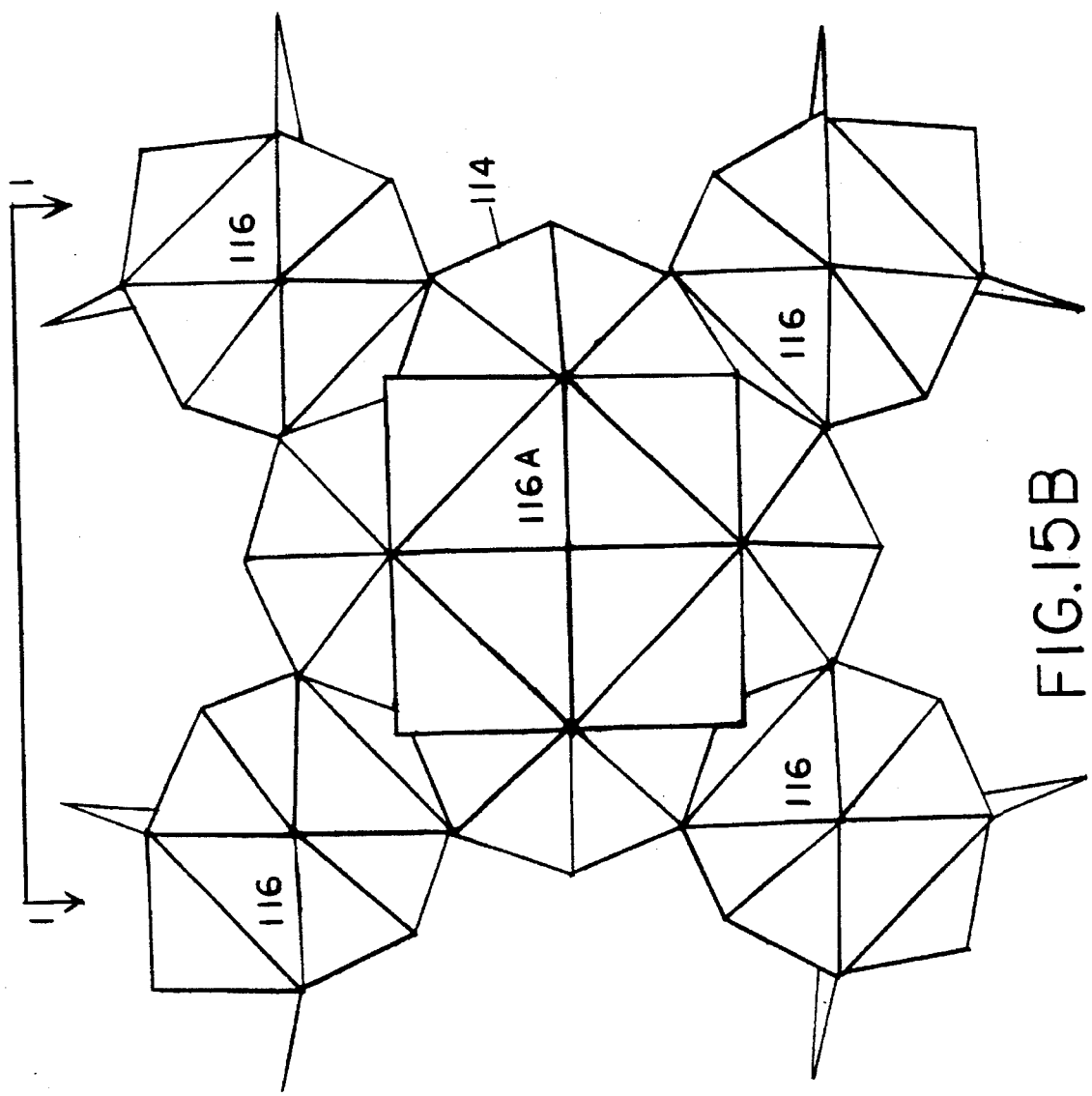

FIG. 15B is top plan perspective view taken along line 1—1 in FIG. 15 A but showing only one of the structures 114. 116A shows a plan view of one of the bulkheads at the interior of one of the faceted cylinders 116.

FIG. 15C is a perspective side view of the exterior of the structure of FIG. 15B taken along line 1—1. Shown are tetrahedral structures 106, shallow octohedral structures 90, faceted cylinders 116, and bulkheads 116A.

Figure 15D:
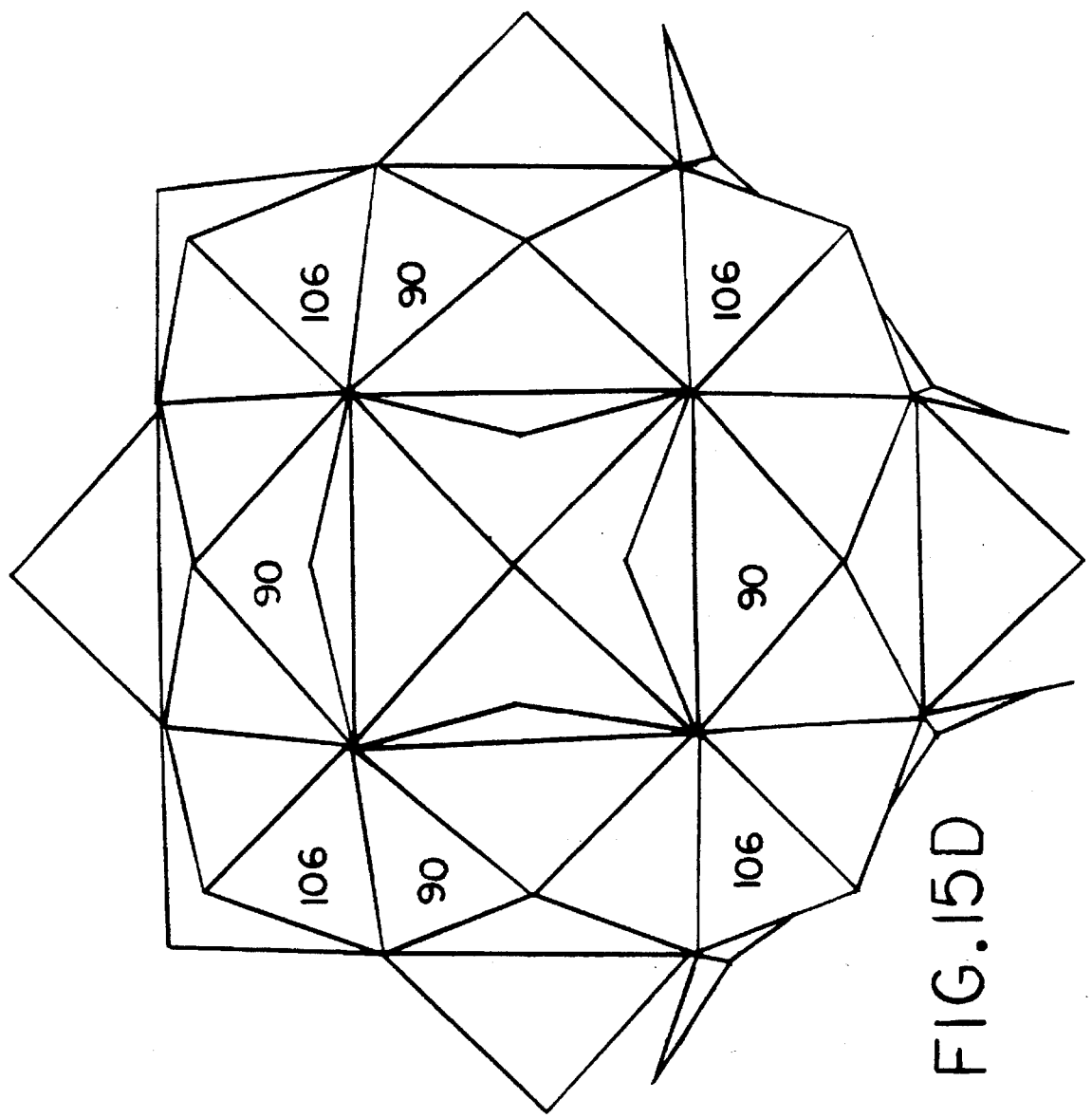

FIG. 15D is a perspective view of the structure of FIG. 15C with the faceted cylinders removed.

FIG. 16A is a perspective partial view of the exterior of an extremely complex structure according to an embodiment of the present invention. It is formed from both 3-stellate-hinged polygonal basic modules 118 utilizing equilateral triangular polygons and 4-stellate-hinged polygonal basic modules 120 utilizing non-equilateral triangular polygons. This structure has the general form of the joinder of four faceted substantially spherical structures intersecting through a complex manifold shape formed of the joinder of the adjacent exteriors of several faceted cylindrical structures 126. The exterior of one of the spherical structures 122 is shown adjacent to a portion of the manifold 124.

FIG. 16B is an interior perspective view of the structure of 16A. The intersection of the 4 faceted substantially spherical structures is partially shown in the manifold void area 124. The faceted cylinders 126 are shown, and the complex polyhedral interior structure is shown to be partially formed of shallow octohedrons 90, and tetrahedrons 106. Areas 114 are spaces formed between the tetrahedrons and other forms of the structure and is similar to the area 114 in FIG. 14B, again showing the continuity of forms between the several structures of the present invention.

FIG. 16C is an additional perspective view of the interior of the structure of FIG. 16A. Shown is area 114 being the space between several of the component parts of the structure, which is similar to area 114 in FIG. 14B.

FIG. 17 is a perspective view of the exterior of a structure having a rigid faceted cylindrical structure 128, at each of its ends joined to a flexible egg-crate like structure 130, at its center. The faceted cylinders 128 have at their interior bulkhead structures similar to those above-described in other faceted cylinders of embodiments of the present invention, being formed of several of the initial polygons of embodiments of the present invention joined, using 4-stellate-hinged non-equilateral polygons.

FIG. 18 is a perspective view of a truss-like structure according to the present invention. It is formed entirely of several 4-stellate-hinged non-equilateral polygonal modules according to embodiments of the instant application joined.

The ratio of the dimensions of the base edge of the polygons at the hinge device to their side edge dimension produces initial polygons and therefore subsequent polyhedral structures of different form. In several preferred embodiments the dimensions are such that the angle subtended by the two sides of the polygon forming the vertex opposite the hinge axis may be 60 degrees, 90 degrees or approximately 108 degrees, or other useful angles, each forming different rigid polyhedron structures. However other polygons may be used, and the preferred embodiments shown in the drawings and descriptions in the instant application are only used to show some particular specific uses of the generic means taught in the present invention.

In a preferred embodiment of the present invention, a three-way hinging of three rigid polygonal structural panels corresponds to a preferred angle of 60 degrees for the angle of vertex of tile polygon opposite the hinge device axis, a four-way hinging of four polygonal panels corresponds to a preferred angle of 90 degrees for the angle of the vertex of the polygon opposite the hinge device, and a five-way hinging of live polygonal wall panels corresponds to a preferred angle of substantially 108 degrees for the angle of the vertex opposite the hinge device. These preferred angles may be used to form useful complex polyhedrons, but other angles may also be used for the formation of other polyhedrons.

FIGS. 5A–5C show some of these useful polygonal wall panels corresponding to the above dimensions. FIG.5A shows the opposite angle within the wall panels, 38 to be 60 degrees corresponding to a three-way stellate, three-polygonal paneled hinge. FIG. 5B shows the angle opposite the hinge device as 90 degrees corresponding to a four-way stellate, four paneled hinge, and FIG. 5C shows an opposite angle of 108 degrees, corresponding to a five-way stellate, five paneled hinge. A truncated panel line 40, shows that a panel may be modified to allow for the formation of openings in the polyhedral structures making tunnel regions connecting different areas within the polyhedral structures.

For a given number of wall panels variably attached about a given hinge axis, some preferred embodiments relating the side dimensions of the polygonal wall panels and therefore the angle subtended by the side dimensions of the polyhedral wall panels are as follows;

Sixty degrees for the angle opposite the hinge axis is useful when three polygonal wall panels meet at a hinge device, Ninety degrees for the angle opposite the hinge axis is useful when four polygonal wall panels meet at a hinge device, One hundred eight degrees for the angle opposite the hinge axis is useful when five polygonal wall panels meet at a hinge device. The above angles are only some preferred embodiments, and other useful angles and corresponding lengths of edges of the polygons are possible to produce useful polyhedral structures.

Typical embodiments of the basic module of the present invention are shown in FIGS. 1A–1D, in plan view. The stellate nature of the multi-leaved hinged panels is shown clearly. 1A shows a two-way hinge, 1B shows a three-way hinge, 1C shows a four-way hinge, and 1D shows a five-way hinge. Other possibilities, for example a seven-way hinge are also possible. The variable angle between the several panels 28, is shown which indicates the movement possible between the locations of the several stellate-hinged polygonal panels. A typical embodiment of the basic module of the present invention is shown in perspective view in FIG.2. A hinge device 14, forms a central axis about which are attached polygonal wall panels 42, which are attached at the base edges 10 of the polygon, and which polygonal wall panels are further made up of side edges 12. At the end of the hinge device 14, may occur a simple end 16, or a more complex connector device, the node 18. The teaching of the basic hinge 14, of the module of the device of the present invention may be a two-way or more than two-way hinge device with thereby two or more polygonal wall panels attached about the basic hinge axis, as above mentioned. The additional connector 22 and 22A which may be a hinge device 22 or a simple rigid connector device 22A, which are typically used to attach together several of the basic modules of embodiments of the present invention at the side edges 12, of the polygons, at various angles of relation to each other. In this way, by the additional aggregation of multiple modules according to embodiments of the present invention the complex polyhedral forms of the present invention are formed. The additional connection 22 or 22A, may have only two polygons meeting at its axis being a two-leaved connection forming either a two-way stellate hinge device or a two-way connection, or may have three or more polygons meeting at their edges at the additional hinge being a three-leaved stellate device forming either a three-way connection 22A or three-way hinge device 22. In some preferrered embodiments, only two polygons are joined at their non-base edges at the additional connection 22, or 22A. However when more than two polygonal non-base edges are joined, in order to further stiffen the structure, the additional connection 22, or 22A, is more than a two leaved connector 22A or hinge device 22. The placement alone of the stellate polygonal basic modules forms the specific geometry which causes the non-rigid basic modules to together form rigid polyhedral structures.

FIGS. 3A–3D shows a device for a four-way stellate hinge showing the sections of the barrel in the several different leaves of the hinge alternating to be able to abutt and align each other with four polygons attached at the single hinge axis. FIG. 3A also shows a ball and socket device attached at the top end of one of the four sections of the hinge, and joined at node device 18. The ball and socket device is only one possible way to achieve the required variability at the node device 18, and may alternately also be achieved by any shape of annular chamber 26, and appropriate interjoining connection device 44, to the void of the chamber. The annulus chamber 26, may be of a circular section which can receive the connection to a ball fitting at the end of the polygons edge to provide the hinge device, thereby forming an annulus-type ball and socket connection, or the annulus chamber may be a t-groove in section to receive a t-shaped device attached at the end of the polygons edge at the hinge axis as required, or may be of any appropriate shape as required.

FIG. 4 is a close-up sectional view of the node device 18. The hinge leaves 24 have attached an interjoining connection device 44, which fits matingly with the annular chamber 26, formed within the body of the connecting node 46. The hinge leaves 24, may be a single planar leaf as in a typical hinge and be connected alongside an abutted adjacent polygonal panel, or may be a double planar leaf which can receive seating between its double planes the edge of the attached polygon within it and thereby make connection, through device 50, or can be comprised of tabs or other connecting device as required. A hinge device 48, is typically located at the center of the basic module. A hinge device provided without the use of an actual physical barrel hinge-type device may be achieved by the use only of the node device 18, located at each end of the hinge axis. This will also allow the hingeable feature of the present invention to be achieved and therefore break line 36 shows a line where the device may be cut to eliminate the actual physical barrel hinge device. In this case, a central bridge device 32, running between the break lines 36 and along the entire axis of the hinge at the base of the polygons may be used to structurally or non-structurally join the adjacent polygonal panels to each other at their base edges.

Attachment device 50, may be holes or other connectors which are appropriately located at the leaves of the hinge as required to attach the hinge device to the polygonal wall panels.

FIGS. 5A–5C show typical polygonal wall panels according to embodiment of the present invention.

FIGS. 6–18 are specific embodiments of complex polyhedral structures formed from combinations of the basic modules of the generic teaching of FIGS. 1–5.

From the description above, a number of advantages of the variable stellate-polygonal modules become evident:

(a) A multiplicity of different structures may be formed from the same extremely simple device, whose constituent parts are similar and interchangeable.

(b) Only one or two different lengths of polygonal sides and one or two different lengths of hinge may be required to achieve the great diversity and complexity of polyhedrons formed by embodiments of the present invention.

(c) All of embodiments of the structures of the present invention may be clad in simple polygonal panels, at its interior and at the exterior.

(d) A hinge device may be achieved not using a physical barrel-type hinge device but by a variable device located at each of the ends of the hinge axis, by a node device having a ball and annular socket.

(e) The embodiments of the present invention will form a great variety of useful new complex polyhedrons not previously known in the prior art.

(f) The embodiments of the present invention will form complex polyhedrons which have discrete stiffening and rigidifying structures located at both the interior and at the exterior of the structures.

OPERATION FIGS. 1–18

The manner of using the embodiments of the present invention involves building up complex polyhedrons from the multiple use of simple linear strut members and simple polygonal panels joined about a hinge device. The basic module embodiments of the present invention is shown in several embodiments in FIGS. 1A–1D. They are shown to be stellate-like modules with varying numbers of polygonal panels 42 attached. The simple polygonal panels 42, have a base edge 10, which is first connected to a hinge device 14, and have remaining side edges 12. Several polygonal wall panels 42, may be connected at their base edges 10 in a stellate manner about the axis of the hinge device 14, thus forming the basic stellate module according to embodiments of the present invention. This is shown along with some additional panels attached in FIG. 2.

After forming a first basic module according to an embodiment of the present invention as above described, additional modules are connected together along their side edges 12, using either additional hinge device 22, or other rigid connections 22A.

The side edges 12 of the polygons may be attached in two different array patterns, each yielding different polyhedral structures. The side edges may be attached using an additional hinge 22 or connector 22A with the alignment such that the vertex corner of the polygons opposite of the hinge axis are aligned abutted adjacent to each other. In this case two of connecting devices 44 meet at the node 18. Alternately, the side edges of the polygons may be attached using additional hinge 22 or connector 22A with the alignment such that one vertex end of the polygon opposite the hinge axis is aligned abutted adjacent to the vertex corner of a base edge of the polygon at the hinge axis. In this case the connecting process 20 is joined to the node in addition to the connection process 44. It is also possible to form the complex polyhedrons according to embodiments of the present invention without the use of the node connectors as abovementioned, and in this case the two different alignment arrays of the sides of the polygons as abovementioned can of course then be accomplished with the use of a physical hinge device only.

By subsequent additional connections of additional basic stellate modules using additional connectors 22A or hinges 22, and by the additional connection of additional polygonal panels by the use of the connecting device of additional hinges 22 or connectors 22A, complex polyhedral structures may be built up.

The building up of complex polyhedral structures with discrete interiors and exteriors by the connection of several stellate-polygonal modules and additional polygonal panels proceeds to form in some cases groupings of deltahedrons joined at their bases, in other cases shallow octohedrons which may be joined at their bases. These groupings may be further connected to form various complex polyhedrons.

Trussed and triangulated structures having substantial depths and various geometric shapes may also be formed by the continued connection of multiple basic modules and additional polygonal panels utilizing the stellate-hinged polygonal embodiment of the present invention.

Complex spaceframe structures having various geometric shapes may be formed by the continued connection of multiple basic stellate modules and additional polygonal panels utilizing the stellate-hinged polygonal embodiments of the present invention.

For some configurations, basic modules may be connected to each other at their side edges 12 by an additional connector 22A or hinge 22 so that the angles subtended by the side edges of each of the polygons forming the vertex opposite the hinge axis are each abutted adjacent to each other. In other configurations the basic modules may be so joined together that the vertex angle opposite the hinge axis of one polygon may be abutted directly adjacent to the node location at the ends of the hinge axis of another polygon, in order to form a different array pattern and achieve different complex geometries.

The making of the multi-leaved hinged polygons as above-described as well as the combining of different numbered stellate hinges, for example three-way hinge, or four-way hinge, and the different angles subtended by the vertex angle of the polygonal panels opposite the hinge axis, and the different orientations of joined adjacent modules, either opposite angle to opposite angle or opposite angle to node end, in their various combinations is responsible for the great variety and complexity of polyhedrons which may be achieved and is one part of the new teaching of embodiments the present invention.

In some cases a species of the instant application has interior and exterior structures being the mirrored discrete opposites of each other but being the identical geometries though reversed; for example in FIGS. 6A, 6B, 7, 12C, 14A, 14B: and in some other cases a species has discretely different geometries on the interior and exterior of the structure; for example FIGS. 8A, 9A, 10B, 11A, 11C, 11D, 15A, 16A, 17.

In some cases structures at the interior are reversed identical but not located exactly as mirrored opposites, for example FIGS. 12A, 12B.

The variable stellate-hinged polygonal feature of the instant application allows for many different geometries and different polyhedrons to be formed and subsequently modified or dismantled and reassembled differently from the same kit of parts. However, since the complex structures newly discovered through experimenting with this variable geometric device are also a new teaching of the present invention being complex polyhedrons completely unknown in the prior art, neither their interior or their exterior ever before taught in the prior art, and subsequently the hinge device itself may be omitted from a final construction of a structure for rigid connectors in the place of the hinge device, such a structure would also constitute a device according to the present invention, being a member of the new family of polyhedrons according to the present invention, having the discrete interior and exterior as newly-taught and above-described.

The stellate-hinge device therefore is both a device for forming the newly discovered polyhedrons and is also a description of the new geometric family of the polyhedrons so formed, called "complex polyhedrons from stellate-hinged polygons with discrete interiors and exteriors". Therefore building the structures formed according to embodiments of the present invention, but not using the hinge device to connect the polygonal panels, but using instead rigid connectors known in the prior art would merely be omitting the variable nature of the basic module, but would still be forming the newly discovered complex polyhedrons of embodiments of the present invention, and would also constitute a device according to embodiments of the present invention, since the polyhedrons themselves are a new teaching of the instant application.

In addition, omitting some or all of the new teaching of the discrete interior framework, would, for the geometries newly disclosed also constitute a device according to an embodiment of the present invention, since the new teaching includes in some embodiments the newly disclosed geometries themselves of the rigid complex polyhedrons formed through the basic module according to an embodiment of the present invention, as described in the appended claims. This is because the newly disclosed geometries themselves, therefore, which are rigid in and of themselves with their exterior forms only, and where the interior frameworks only serve to additionally rigidify the structures, would themselves comprise and constitute a device according to an embodiment of the present invention.

Embodiments of the present invention teach a practical means to form complex structures from very simple parts; it is therefore a pragmatic embodiment in physical objects of one of the ways in which complexity arises out of simplicity. The complete catalogue of useful structures possible to be constructed from the embodiments of the present invention has not yet been exhausted as the simple variations possible in the component parts are numerous and not yet fully discovered. The device is a tool to discover the full range of the new geometric species according to the instant application. The applicant continues to develop new geometric models from embodiments of the present invention, using only the particular features included in the appended claims.

In addition, using a small beginning number of basic modules of the instant application, a small structure may be initially constructed. Then with the addition of greater numbers of basic modules according to embodiments of the instant application, a more complex and larger structure may be formed by reconfiguring the initial construction into a larger enclosure. A new type of building technology is taught wherein the several parts are substantially identical and therefore interchangeable and reuseable.

Summary, Ramifications, and Scope

Thus the reader will see that the variable non-rigid multiple stellate-hinged polygonal modules of the invention formed of stellate-hinged polygonal panels are joined with others of like kind making a new useful family of rigid complex polyhedral models with discrete interior and exterior structures. The models can be used in frameworks for architectural or engineering or other structures.

A new family of complex polyhedral models is disclosed in embodiments of the present invention. A new family of rigid frameworks are disclosed which are made from a previously unknown family of polyhedral models. These new polyhedrons are made from the joining of a multiplicity of modules made from variable stellate-hinged polygonal frameworks in a variety of different hinged orientations and arrays.

A minimum inventory, maximum diversity system is taught, having for the simple device invested, a great diversity of complex geometric frameworks possible to be formed by the device. The new structures of the teaching of this application can all be sheathed or covered by simple polygonal panels.

Accordingly, the reader will see that the variable stellate-hinged polygonal panel module of this invention can be easily used to form a great diversity of engineering or architectural structures or toys, and these complex structures can be made from structural members commonly known in the prior art, for example, linear strut; hinge; polygonal panel; ball and socket and the like. Furthermore the variable stellate-hinged polygonal panel module has the additional advantages in that

- it permits the formation of a great variety of previously unknown diverse complex polyhedrons made from a simple device, the basic module;
- it permits that the structures formed may easily be disassembled and reconfigured making them larger or smaller or varying the complexity or the array pattern as the need arises since all of the complex structures are formed of the same simple identical kit of interchangeable parts;
- it provides for the formation of structures of complex polyhedrons of such density of triangulated structure that sufficient rigidity is achieved that the structures may resist substantially heavy loads, although they are made from non-rigid variable modules;
- it permits, because of the simplicity of forms of the basic modules, that a manufacturing enterprise may be developed with ease and using only known industrial processes.
- it provides a very simple modular means which may be arrayed and configured into a great variety of forms enclosing small and large volumes of great diversity; an entire small city may be formed using only the basic module of the instant application.

Although the description above contains many specificities, these should not be construed as limiting the scope of the invention but as merely providing illustrations of some of the presently preferred embodiments of this invention. For example the polygonal panels may be curved panels; dimensions of the individual polygons may be altered to change the subsequent resulting complex polyhedrons thus formed; various combinations of different basic stellate-hinged modules may be utilized, such as a combination of each of a three-way a four-way and a five-way hinge may be utilized to achieve a finished form of a complex polyhedron; the structures of embodiments the invention may be combined with traditional known structures of the prior art; the structures of the invention may be additionally truncated, dissected, stellated or aggregated or a combination of these to form additional complex structures. For example a triangular polygonal panel as abovedescribed may have its vertices truncated to form a six-sided polygon used in a stellate hinge to form additional tunnel regions within the complex structures of embodiments of the present invention.

As abovementioned the device of the instant application is also a tool which may be used to develop additional complex polyhedrons of the generic family of the polyhedrons of embodiments of the present invention.

Thus the scope of the invention should be determined by the appended claims and their legal equivalents, rather than by the examples given.

What is claimed is:

1. A structure from a family of polyhedral models and rigid structures having discrete interior and exterior structural elements, the structure comprising:
   a plurality of basic stellate-hinged polygonal modules, each module including:
   at least three polygonal structures, each of the polygonal structures having a base edge and at least two side edges;
   at least one hinge;
   said polygonal structures each coupled by the base edge to said hinge to form one of said plurality of basic stellate-hinged polygonal modules, wherein each angle subtended between any two of said at least three polygonal structures of the one basic stellate-hinged polygonal module is variable about said hinge;
   wherein the structure includes at least two of the plurality of the basic stellate-hinged polygonal modules coupled to each other along corresponding side edges of at least one of the at least three polygonal structures of each of the at least two basic stellate-hinged modules;
   wherein a second angle subtended between the coupled polygonal structures of each of the coupled at least two basic stellate-hinged polygonal modules at their side edges is variable; and
   wherein additional basic stellate-hinged polygonal modules are similarly coupled together with the at least two basic stellate-hinged polygonal modules to form the structure.

2. The structure according to claim 1, wherein the hinge of at least one of the plurality of stellate-hinged polygonal modules is formed by a barrel-type hinge.

3. The structure according to claim 1, wherein the hinge of at least one of the plurality of stellate-hinged polygonal modules has an axis with two opposite ends, and wherein the hinge is formed by opposing balls and corresponding annular sockets located at each of the opposite ends of the hinge axis.

4. The structure according to claim 1, wherein each of the at least three polygonal structures of at least one of the plurality of stellate-hinged polygonal modules is an equilateral triangular polygon.

5. The structure according to claim 1, wherein each of the at least three polygonal structures of at least one of the plurality of stellate-hinged polygonal modules is a non-equilateral triangular polygon.

6. The structure according to claim 1, wherein the hinge of each of the plurality of stellate-hinged polygonal modules has two opposite ends, and wherein the side edges of the coupled at least two stellate-hinged polygonal modules are oriented so that one of the two opposite ends of the hinge of one of the at least two stellate-hinged polygonal modules abuts with one of the two opposite ends of the hinge of the other of the at least two stellate-hinged polygonal modules.

7. The structure according to claim 1, wherein the hinge of the at least two stellate-hinged polygonal modules has two opposite ends, and wherein the corresponding coupled side edges of the at least two basic stellate-hinged polygonal modules are oriented so that one end of the two opposite ends of the hinge of one of the at least two basic stellate-hinged polygonal modules abuts with a vertex connection of ends of the at least two side edges of one of the at least three polygonal structures of the other of the at least two basic stellate-hinged polygonal modules.

8. The structure according to claim 1, wherein at least one additional linear structural element is located between two different polygonal structures at a vertex connection of ends between the at least two side edges for each of the two different polygonal structures.

9. The structure according to claim 1, wherein at least one additional linear structural element is located between any points along an edge of one of the at least two side edges of two different polygonal structures.

10. The structure according to claim 1, wherein the base edges of the at least three polygonal structures of the at least two basic stellate-hinged polygonal modules are of equal length.

11. The structure according to claim 1, wherein some of the at least three polygonal structures of the plurality of basic stellate-hinged modules in said structure are removable from either an inside or an outside of said structure to form openings in the structure while still maintaining rigidity of the structure.

12. The structure according to claim 1, wherein the hinge includes a double leaved planar connector, and wherein the at least three polygonal structures are each coupled by their base edges to the hinge by the double leaved planar connector.

13. The structure according to claim 1, wherein a single exterior geometric polyhedral framework is formed from the plurality of basic stellate-hinged polygonal modules and joined to a discrete additional interior polyhedral framework formed from the plurality of basic stellate-hinged polygonal modules to form the rigid polyhedral structure.

14. The structure according to claim 1, wherein the at least two side edges of the at least three polygonal structures are of equal length.

15. The structure according to claim 1, wherein the at least two side edges of the at least three polygonal structures are of different length.

16. The structure according to claim 1, wherein the polyhedral structure has a form being at least partial dissections of aggregations of the plurality of basic stellate-hinged polygonal modules.

17. The structure according to claim 1, wherein each edge and surface at an exterior of the polyhedral structure has a corresponding but inverted edge and surface at an interior of the polyhedral structure.

18. The structure according to claim 1, wherein all interior edges of the polyhedral structure meet at a single point.

19. The structure according to claim 1, wherein the plurality of basic stellate-hinged polygonal modules form a 30-sided deltahedron in which all interior edges meet at a single point.

20. The structure according to claim 1, wherein the plurality of basic stellate-hinged polygonal modules form a 48-sided deltahedron in which all interior edges meet at a single point.

21. The structure according to claim 1, wherein the polyhedral structure has a form of 3 faceted cylindrical structures with multiple interior bulkheads, the cylindrical structures joined together in a triangular array.

22. The structure according to claim 1, wherein the plurality of basic stellate-hinged polygonal modules form several different structures each having a centrally located faceted cylindrical structure having two opposite ends, and which flares at least at one of the opposite ends into a parasol-like faceted ellipsoid structure radiating out from the central faceted cylindrical structure.

23. The structure according to claim 1, wherein the plurality of basic stellate-hinged polygonal modules form shallow octahedrons, and wherein the shallow octahedrons are joined to form a structure with two parallel planes of joined shallow octahedrons that are joined together by other shallow octahedrons located normal to and between the two parallel planes.

24. The structure according to claim 1, wherein the plurality of basic stellate-hinged polygonal modules form tetrahedrons, and wherein the tetrahedrons are joined to form several different substantially cylindrical structures having different amounts of concavity and complexity.

25. The structure according to claim 1, wherein the plurality of basic stellate-hinged polygonal modules form tetrahedrons, and wherein the tetrahedrons are joined to form a variable planar structure.

26. The structure according to claim 1, wherein the plurality of basic stellate-hinged polygonal modules form octahedrons and tetrahedrons, and wherein the octahedrons and the tetrahedrons are joined to form several different substantially spherical complexly concave polyhedral structures.

27. The structure according to claim 1, wherein the plurality of basic stellate-hinged polygonal modules form a structure being a triakis icasahedron at its exterior and a great dodecahedron at its interior.

28. The structure according to claim 1, wherein the plurality of basic stellate-hinged polygonal modules form faceted cylindrical structures having interior bulkheads, octahedrons and tetrahedrons, and wherein the octahedrons and tetrahedrons are joined to form substantially spherical structures in a rectilinear grid joined to each other by sections of the faceted cylindrical structures having interior bulkheads.

29. The structure according to claim 1, wherein the plurality of basic stellate-hinged polygonal modules form octahedrons and tetrahedrons, and wherein the octahedrons and the tetrahedrons are joined to form four faceted substantially spherical structures which form a complex polyhedral structure by joining the four faceted substantially spherical structures together to form faceted cylindrical structures with interior bulkheads and a complex manifold chamber space between the four structures.

30. The structure according to claim 1, wherein the plurality of basic stellate-hinged polygonal modules are coupled together to form a flexible egg-crate like structure.

31. The structure according to claim 1, wherein the plurality of basic stellate-hinged polygonal modules are coupled together to form a truss-like structure.

32. The structure according to claim 1, wherein the base edges of the at least three polygonal structures of the at least two basic stellate-hinged modules are different lengths.

33. The structure according to claim 1, wherein the base edge and the at least two side edges each have opposite ends, wherein the hinge forms the base edge of each of the at least three polygonal structures, wherein the at least two side edges of each of the at least three polygonal structures are coupled to each other at one of the opposite ends of each of the at least two side edges, and wherein the other of the opposite ends of each of the at least two side edges are each coupled to the opposite ends of the hinge.

34. The structure according to claim 1, wherein the plurality of basic stellate-hinged polygonal modules form shallow octahedrons and tetrahedrons, wherein the shallow octahedrons and tetrahedrons are coupled together to provide a structure having the form of a faceted ellipsoid with opposite ends and a perimeter, and wherein the faceted ellipsoid is coupled by the perimeter to three smaller polyhedral structures, and which also includes an interior with a centrally located faceted cylindrical structure having two opposite ends which flares at each of the opposite ends into the opposite ends of the faceted ellipsoid.

35. A method for assembling a structure from a family of complex polyhedral models and rigid structures having discrete interiors and exteriors, the method comprising the steps of:

assembling a first basic stellate-hinged polygonal module the module including:

providing at least three polygonal structures, each having a base edge and at least two side edges;

providing at least one hinge;

coupling each of said at least three polygonal structures by their base edges to said hinge to form said first basic stellate-hinged polygonal module, wherein each angle subtended between any two of said at least three polygonal structures of said first basic stellate-hinged polygonal module is variable;

forming an additional substantially similar second basic stellate-hinged polygonal module;

joining the additional second basic stellate-hinged polygonal module to the first basic stellate-hinged polygonal module at corresponding side edges of one of the at least three polygonal structures of each of the modules;

wherein a second angle subtended between the coupled polygonal structures of the coupled modules at their side edges is variable; and wherein additional basic stellate-hinged polygonal modules are joined to the first basic stellate-hinged polygonal module and the additional similar second basic stellate-hinged polygonal module at the side edges of their polygonal structures, thereby progressively assembling the structure.

36. A stellate building module for constructing complex polyhedrons and structures, the module comprising:

at least three polygonal structures, each polygonal structure having a base edge and at least two side edges; and a hinge coupled to the base edge of each of the at least three polygonal structures to form a stellate-hinged building module;

wherein each of the at least three polygonal structures can rotate about the hinge independently of the other polygonal structures, and wherein the side edges of the polygonal structures are adapted to be coupled to side edges of other stellate building modules to form complex polyhedrons.

37. The module according to claim 36, wherein the hinge is wall size, and wherein the polygonal structures are wall sized panels.

38. The module according to claim 36, wherein the hinge of the stellate building module is formed by a barrel-type hinge.

39. The module according to claim 36, wherein each of the at least three polygonal structures is an equilateral triangular polygon.

40. The module according to claim 36, wherein each of the at least three polygonal structures is a non-equilateral triangular polygon.

41. The module according to claim 36, wherein each of the at least three polygonal structures are formed by a plurality of linear struts having two opposite ends, and wherein at least one additional linear strut is located between any point between the two opposite ends of the linear struts of at least two different polygonal structures of the complex polyhedrons.

42. The module according to claim 36, wherein the hinge includes double leaved planar forms for matingly engaging the said at least three polygonal structures.

43. A stellate building module for constructing complex polyhedrons and structures, the module comprising:

at least three polygonal structures, each polygonal structure having a base edge and at least two side edges; and a hinge coupled to the base edge of each of the at least three polygonal structures to form a stellate-hinged building module;

wherein each of the at least three polygonal structures can rotate about the hinge independently of the other polygonal structures, and wherein the side edges of the polygonal structures are adapted to be coupled to side edges of other stellate building modules to form complex polyhedrons and wherein the hinge of the stellate building module has an axis with two opposite ends, and wherein the hinge is formed by opposing balls and corresponding annular sockets located at each of the opposite ends of the hinge axis.

* * * * *